United States Patent
Kamiura et al.

(10) Patent No.: US 9,866,058 B2
(45) Date of Patent: Jan. 9, 2018

(54) POWER FEEDING DEVICE, POWER RECEIVING DEVICE, AND WIRELESS POWER TRANSMISSION DEVICE

(71) Applicant: TDK CORPORATION, Tokyo (JP)

(72) Inventors: Naoko Kamiura, Tokyo (JP); Kaoru Matsuoka, Tokyo (JP); Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 473 days.

(21) Appl. No.: 14/196,515

(22) Filed: Mar. 4, 2014

(65) Prior Publication Data

US 2014/0252869 A1    Sep. 11, 2014

(30) Foreign Application Priority Data

Mar. 8, 2013  (JP) ................................ 2013-046624
Feb. 21, 2014  (JP) ................................ 2014-031753

(51) Int. Cl.
*H02J 7/02*   (2016.01)
*H01F 38/14*  (2006.01)
*H02J 7/00*   (2006.01)
*H02J 17/00*  (2006.01)

(52) U.S. Cl.
CPC .............. *H02J 7/025* (2013.01); *H01F 38/14* (2013.01); *H02J 7/0042* (2013.01); *H02J 17/00* (2013.01)

(58) Field of Classification Search
CPC .. H02J 7/02; H02J 7/025; H02J 7/0042; H02J 17/00; H01F 38/14

USPC ........................................................ 307/104
See application file for complete search history.

(56) References Cited

U.S. PATENT DOCUMENTS

| | | | |
|---|---|---|---|
| 2005/0140564 A1 | 6/2005 | Deguchi et al. | |
| 2010/0171371 A1* | 7/2010 | Kriuk | H01Q 1/36 307/104 |
| 2013/0127253 A1* | 5/2013 | Stark | A61N 1/3787 307/104 |
| 2013/0310629 A1* | 11/2013 | Lafontaine | A61M 1/127 600/16 |

FOREIGN PATENT DOCUMENTS

| | | |
|---|---|---|
| JP | A-04-317527 | 11/1992 |
| JP | H06-029215 U | 4/1994 |
| JP | 2000-172795 A | 6/2000 |
| JP | A-2005-110399 | 4/2005 |
| JP | 2005-151105 A | 6/2005 |
| JP | A-2009-268248 | 11/2009 |
| JP | 2010-080851 A | 4/2010 |
| JP | 2013-115069 A | 6/2013 |
| WO | 2013/078092 A1 | 5/2013 |

\* cited by examiner

*Primary Examiner* — Daniel Kessie
(74) *Attorney, Agent, or Firm* — Oliff PLC

(57) ABSTRACT

A power receiving device, a power feeding device, and a wireless power transmission device are provided. The power receiving device receives power wirelessly transmitted from the power feeding device and includes one or more power receiving units. At least one of the power receiving units in the power receiving device is disposed along two or more surfaces which form the outer shape of the power receiving device and are not parallel to each other.

4 Claims, 23 Drawing Sheets

POWER FEEDING DEVICE, POWER RECEIVING DEVICE, AND WIRELESS POWER TRANSMISSION DEVICE

BACKGROUND OF THE INVENTION

1. Field of the Invention

The present invention relates to a power feeding device, a power receiving device, and a wireless power transmission device.

2. Description of the Related Art

A power feeding technology which supplies power without using a power cord, that is, a wireless power feeding technology has attracted attention. Since the wireless power feeding technology is able to supply power from power feeding equipment to power receiving equipment in a non-contact manner, it is expected to be applied to various products such as transportation equipment including trains and electric vehicles, household appliances, electronic equipment, wireless communication equipment, and toys.

In devices to be used in the wireless power feeding technology, magnetic coupling between a power feeding unit such as coils on the power feeding equipment side and a power receiving unit such as coils on the power receiving equipment side is important in order to efficiently transmit power from circuits on the power feeding equipment side to circuits on the power receiving equipment side.

FIGS. 22 and 23 illustrate an example of a wireless power transmission device by electromagnetic induction. In FIG. 22, a power receiving device 286 is compact electric equipment. In FIG. 23, a power receiving device 306 is an electric vehicle. In wireless power transmission devices 200, 300, primary coils L1 constituting power feeding units 283, 303 of power feeding devices 284, 304 and secondary coils L2 constituting power receiving units 285, 305 of power receiving devices 286, 306 are respectively opposed to each other, so that power is supplied from the power feeding devices 284, 304 to the power receiving devices 286, 306. Since each of the primary coils L1 and the secondary coils L2 is respectively located at one position of the power feeding devices 284, 304 and one position of the power receiving devices 286, 306, it is difficult to supply power to the power receiving device 286, 306 in a state having a good transmission efficiency while having a degree of freedom in the arrangement of the power receiving devices 286, 306 and the power feeding devices 284, 304.

From the viewpoint of the arrangement of the power receiving device, Japanese Unexamined Patent Application Publication No. 2005-110399 discloses a power supplying system in which a plurality of power transmission-side coils and power reception-side coils are respectively provided in power transmission equipment and power receiving equipment so that a user is able to arrange the power transmission equipment and the power receiving equipment without worrying about their positional relationships.

In the above-described power supplying system, a circuit that outputs a signal is provided. The circuit outputs a signal so that among the plurality of power transmission-side coils and power reception-side coils a power transmission-side coil and a power reception-side coil of which power transmission efficiency is best can operate.

Further, Japanese Unexamined Patent Application Publication No. 4-317527 discloses a non-contact charging device. The non-contact charging device includes an electric equipment main body having a secondary coil of a loop shape and a charging unit that charges a storage battery by an output of the secondary coil; and a charger which has a box body made from a magnetic material that retractably houses the electric equipment main body inside thereof, a primary coil of a loop shape which is wound along an inner peripheral surface of the box body, and a charging circuit that supplies a primary current to the primary coil, and supplies power to the charging unit of the electric equipment main body.

On the other hand, from the viewpoint of power transmission efficiency, Japanese Unexamined Patent Application Publication No. 2009-268248 discloses mobile equipment of which a rear face is curved, and a charging base of which a bottom face is curved so that power is easily transferred from the charging base to the mobile equipment.

SUMMARY OF THE INVENTION

However, in the power supplying system described in Japanese Unexamined Patent Application Publication No. 2005-110399, when a power transmitting module and a power receiving module are formed by using a plurality of transmission-side coils and reception-side coils, increase of the number of wires and the number of control devices causes problems that a circuit becomes complicated, a device tends to be enlarged, and costs increase.

Further, there are some limitations in a positional relationship between the power receiving device and the power feeding device in order to perform the power transmission efficiently.

Even in a non-contact charging device equipped with a charger described in Japanese Unexamined Patent Application Publication No. 4-317527, it is necessary to dispose an electric equipment main body so that a magnetic flux, which is generated from a bottom face side of a box body to a direction of a cover, can link with a coil surface of a secondary coil, and thus convenience is not sufficient.

A mobile equipment and a charging base which are described in Japanese Unexamined Patent Application Publication No. 2009-268248 can suppress the positional deviation between an induction coil on the mobile equipment side and a power source coil on the charging base side. However, even if any surface other than the surface opposing induction coil in the mobile equipment is opposed to the charging base, it is difficult to charge the mobile equipment. Accordingly, there are some limitations in the arrangement of the mobile equipment.

The present invention aims to provide a power feeding device, a power receiving device, and a wireless power transmission device, which are capable of improving the convenience of users and of suppressing increase in the size of the equipment, by having a degree of freedom in the arrangement of the power receiving device with respect to the power feeding device, or the arrangement of the power feeding device with respect to the power receiving device.

The present invention provides a power receiving device to which power is transmitted from a power feeding device wirelessly, comprising one or more power receiving units, wherein at least one of the power receiving units is disposed along two or more surfaces which form the outer shape of the power receiving device and are not parallel to each other.

In the present invention, a plurality of surfaces of the power receiving device serve as surfaces to receive power for one power receiving unit. Thus, as compared to a case where one surface of the power receiving device serves as a surface to receive power for one power receiving unit and a plurality of surfaces serve as surfaces to receive power, it is possible to simplify wiring and the like connected to the power receiving unit. Further, the power receiving device has one or more power receiving units, so that it is possible to transmit power while having a degree of freedom in an arrangement of the power receiving device and the power feeding device.

Further, in the power receiving device according to the present invention, power receiving faces of a power receiving unit may be disposed along two or more surfaces which form the outer shape of the power receiving device and are not parallel to each other. This makes it possible for one power receiving unit to receive power through a plurality of surfaces.

Further, the present invention provides a power feeding device which transmits power wirelessly to a power receiving device, comprising one or more power feeding units, wherein at least one of the power feeding units is disposed along two or more surfaces which form the outer shape of the power feeding device and are not parallel to each other.

According to the present invention, the power feeding unit of the power feeding device has the above configuration, so that a magnetic flux links with the power receiving unit through a plurality of surfaces of the power feeding device for one power feeding unit, and a plurality of surfaces of the power feeding device serve as surfaces to supply power. Thus, as compared to a case where one surface of the power feeding device serves as a surface to supply power for one power feeding unit and a plurality of surfaces serve as surfaces to supply power, it is possible to simplify wiring and the like connected to the power feeding unit. Further, the power feeding device has one or more power feeding units, so that it is possible to transmit power while having a degree of freedom in an arrangement of the power receiving device and the power feeding device.

Further, in the power feeding device according to the present invention, power feeding faces of a power feeding unit may be disposed along two or more surfaces which form the outer shape of the power feeding device and are not parallel to each other. This makes it possible for one power feeding unit to feed power through a plurality of surfaces.

Furthermore, the present invention provides a wireless power transmission device comprising; a power receiving device including a power receiving unit; and a power feeding device including a power feeding unit, wherein the power receiving device and the power feeding device are disposed so that at least a part of the power receiving unit and at least a part of the power feeding unit are opposed to each other, and wherein at least one of the power receiving device and the power feeding device is the power receiving device described above or the power feeding device described above.

In the wireless power transmission device according to the present invention, since the power receiving device or the power feeding device according to the present invention is used as at least one of the power receiving device and the power feeding device, the wireless power transmission device can transmit power while having a degree of freedom in the arrangement of the power receiving device or the power feeding device.

According to the present invention, it is possible to provide a power feeding device, a power receiving device, and a wireless power transmission device, which are capable of improving the convenience of the user and suppressing increase in the size of the equipment, by having a degree of freedom in the arrangement of the power receiving device with respect to the power feeding device, or the arrangement of the power feeding device with respect to the power receiving device.

DESCRIPTION OF THE PREFERRED EMBODIMENTS

Figure 1:
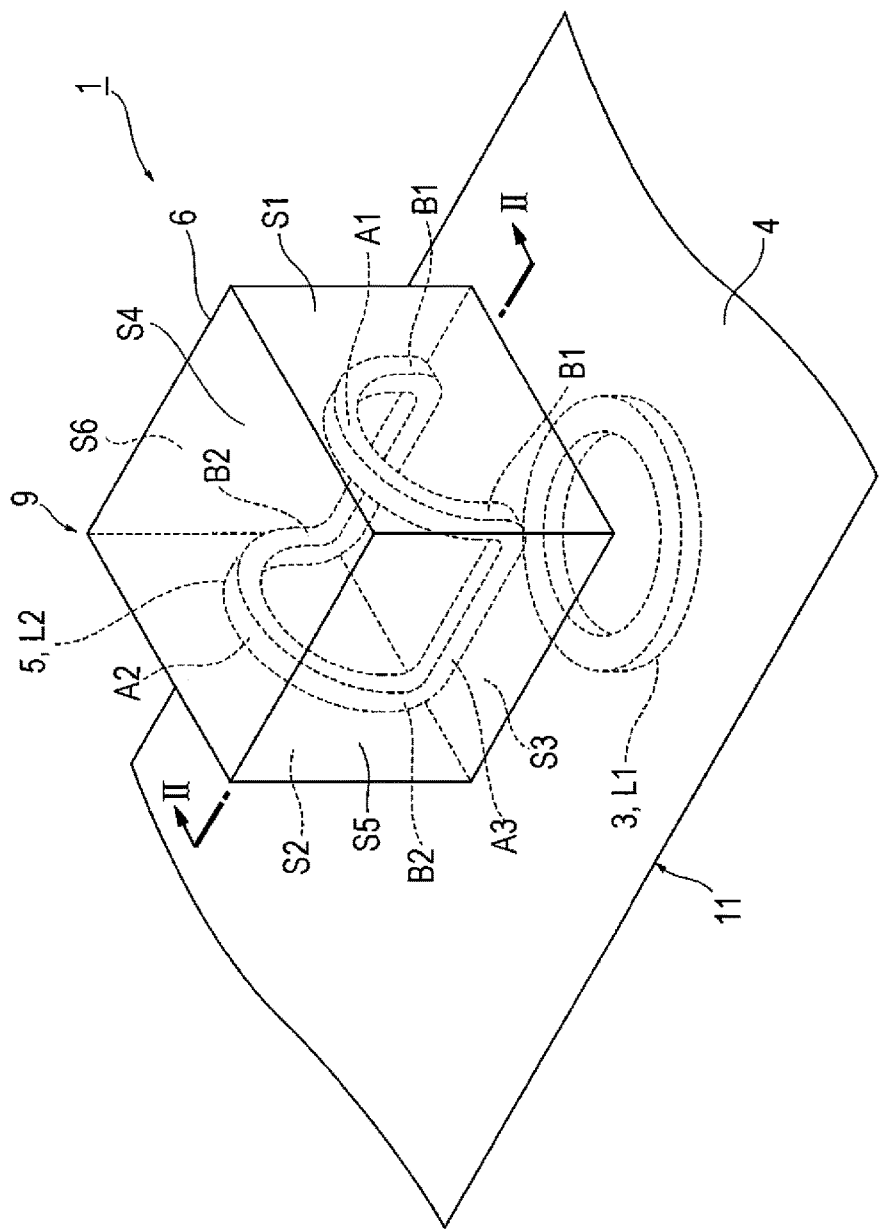
FIG. 1 is a perspective view of a wireless power transmission device according to a first embodiment of the present invention.

Preferred embodiments of the present invention will be described in detail with reference to the drawings, however, the present invention is not intended to be limited to the following embodiments. In addition, in the following description, the same or corresponding parts are denoted by the same reference numerals, and thus the redundant description thereof will be omitted.

[First Embodiment]

Figure 2:
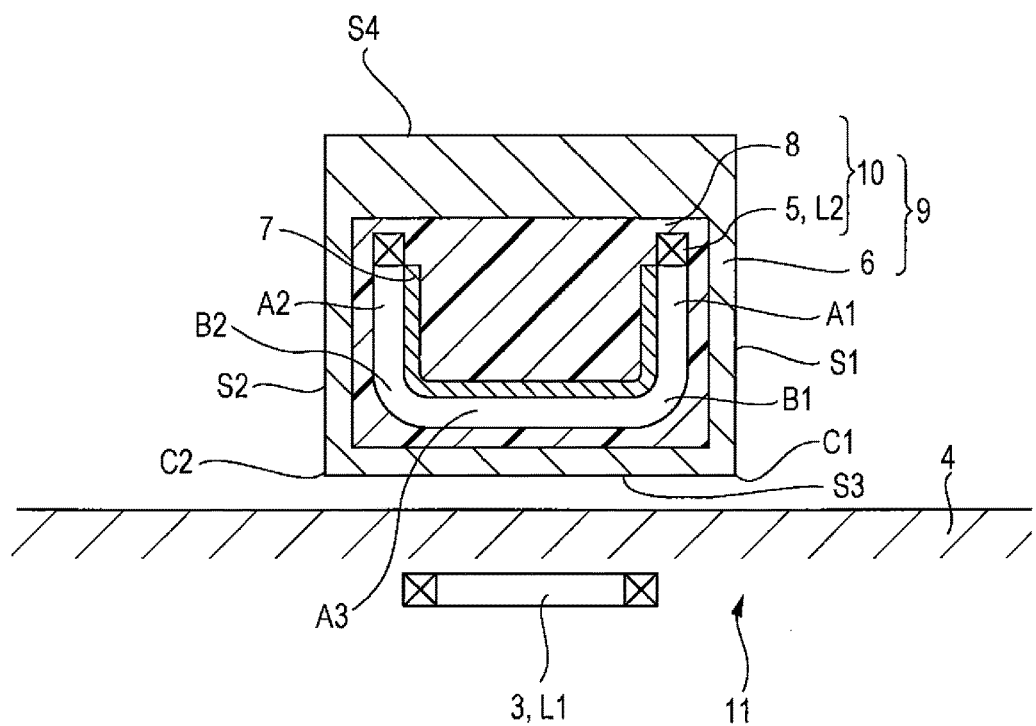
FIG. 2 is a cross-sectional view taken along a cutting line II-II of the wireless power transmission device according to the first embodiment of the present invention.

FIG. 1 is a perspective view of a wireless power transmission device according to a first embodiment, and FIG. 2 is a cross-sectional view taken along a cutting line II-II of the wireless power transmission device according to the first embodiment of the present invention. The wireless power transmission device 1 according to the first embodiment, illustrated in FIGS. 1 and 2 includes a power receiving device 9 according to the present invention and a power feeding device 11. The power receiving device 9 has a power receiving device main body 6 and a power receiving unit 5, and the power feeding device 11 has a power feeding device main body 4 and a power feeding unit 3, respectively. The power receiving unit 5 is constructed of a secondary coil L2, and the power feeding unit 3 is constructed of a primary coil L1. By the secondary coil L2 and the primary coil L1 being electromagnetically coupled, power is transmitted wirelessly from the power feeding device 11 to the power receiving device 9.

Figure 3:
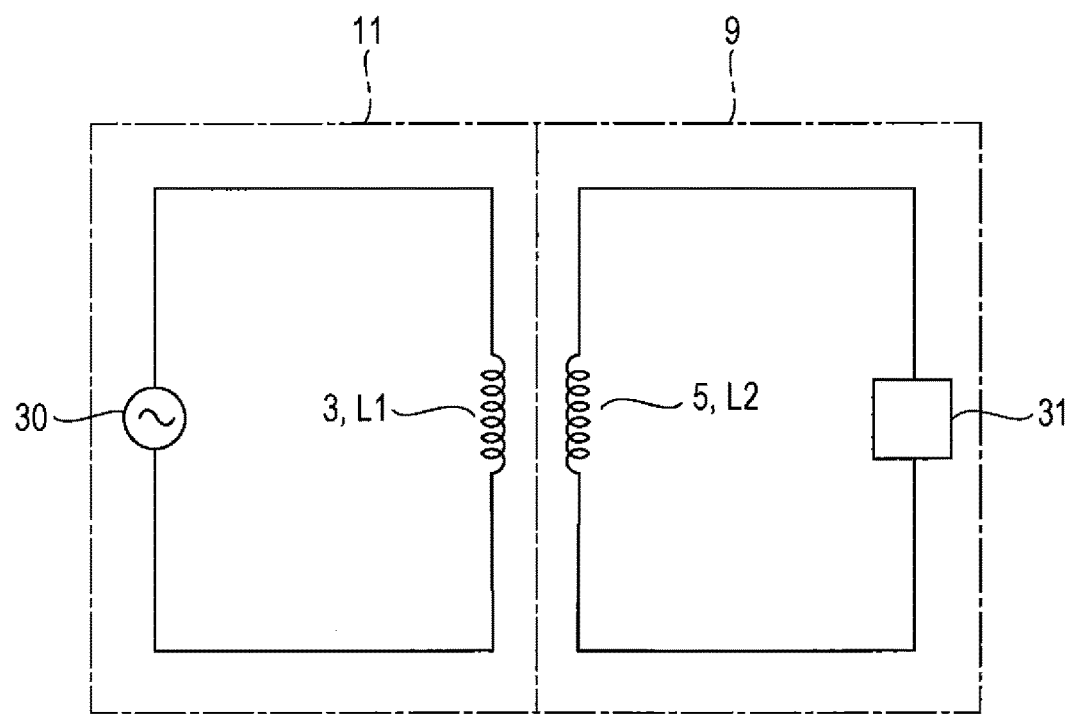
FIG. 3 is a schematic diagram illustrating an example of a combination mode of a power feeding unit and a power receiving unit.

FIG. 3 is a schematic diagram illustrating an example of a combination mode of the power feeding unit and the power receiving unit. In the power feeding device 11, a magnetic field is generated over a circumference from the inside of the primary coil L1 by a current from an AC power source 30 flowing through the primary coil L1. The power receiving device 9 is disposed adjacent to the power feeding device 11 so that the secondary coil L2 opposes the primary coil L1, and a current flows through the secondary coil L2 by the magnetic field generated from the primary coil L1. A rectifier 31 rectifies the generated current, thereby allowing power to be supplied to the power receiving device 9. The strength of the magnetic field generated from the primary coil L1 varies depending on the magnitude of the current flowing through the primary coil L1, the size of the primary coil L1, the number of turns or the like. Further, the strength of a magnetic field induced in the secondary coil L2 and the magnitude of the current vary depending on the strength of the magnetic field generated from the primary coil L1, the size of the secondary coil L2, the number of turns or the like. The parameters such as the current flowing through the primary coil L1 are adjusted so that the power of an appropriate amount is supplied to the power receiving device 9.

(Power Receiving Device)

As illustrated in FIGS. 1 and 2, the surface shape (hereinafter, referred to as "outer shape") of the power receiving device 9 is a rectangular parallelepiped having six surfaces. The power receiving device 9 includes a power receiving device main body 6, and a power receiving unit package 10 in which the secondary coil L2 is packaged by a resin 8 or the like. The power receiving unit package 10 is incorporated into the power receiving device main body 6 having an outer shape of a rectangular parallelepiped having six surfaces. In the present embodiment, the surfaces which form the outer shape of the power receiving device 9 correspond to the surfaces which form the outer shape of the power receiving device main body 6. A face S3 is a surface (a bottom face of the power receiving device 9) which is opposed to a surface in which the primary coil L1 of the power feeding device 11 is disposed, and faces S1 and S2 are surfaces (side faces of the power receiving device 9) adjacent to the face S3, and the faces S1, S3, and S2 are continuously disposed in this order. The faces S1 and S3 are not parallel to each other, and the faces S2 and S3 are not parallel to each other. The secondary coil L2 is disposed along the faces S1, S2, and S3 which have the aforementioned positional relationship. Here, the state "along the surface" means that the distances from the surfaces of the power receiving device 9 and the positional relationships with the surfaces of the power receiving device 9 are insured to an extent that the secondary coil L2 forms an area capable of receiving power from the power feeding device 11 in the surface of the power receiving device 9. If the secondary coil L2 has a part located along at least two surfaces which form the outer shape of the power receiving device 9 and are not parallel to each other, even if the secondary coil L2 has a part located along surfaces (face S1 and face S2) which are parallel to each other, it is possible to achieve the effect of the present invention.

The secondary coil L2 includes a winding portion formed by wound conductive wires and an opening portion which is surrounded by the winding portion and has two opening ends opposed to each other, and has portions A1, A2, and A3 respectively located along three faces S1, S2, and S3 among six faces S1, S2, S3, S4, S5, and S6 of the power receiving device 9. The portion A3 along the bottom face S3 and portion A1 or A2 respectively located along the side faces S1 and S2 are continuously disposed through a connecting portion B1 or B2. As described below, the connecting portion B1 and B2 are curved or bent along the outer shape of the power receiving device 9. In other words, in the secondary coil L2, the power receiving face may be disposed along two faces S1 and S3 which form the outer shape of the power receiving device 9 and are not parallel to each other and two faces S2 and S3 which form the outer shape of the power receiving device 9 and are not parallel to each other. The "power receiving face of the coil" in this embodiment means "an opening portion of the coil". From the viewpoint of power transmission efficiency, it is preferable that a magnetic body 7 be provided in a face on a side opposite to the face facing the bottom face S3 out of the faces of the secondary coil L2 so as to configure the power receiving unit 5.

The secondary coil L2 includes three planer portions A1, A2, and A3, a connecting portion B1 which is curved or bent (curved portion or bent portion) while being interposed between the planer portions A1 and A3, and a connecting portion B2 which is curved or bent (curved portion or bent portion) while being interposed between the planer portions A2 and A3. The planer portion A3 is opposed to the bottom face S3 of the power receiving device 9 and the planer portions A1 and A2 are opposed to the side faces S1 and S2 of the power receiving device 9 from the inside of the power receiving device main body 6. It is preferable that the planer portions A1, A2, and A3 be disposed so as to be respectively parallel to the faces S1, S2, and S3. In addition, the connecting portion B1 is disposed so as to oppose the joining portion C1 at which the bottom face S3 and the side face S1 of the power receiving device 9 are in contact from the inside of the power receiving device main body 6, and the connecting portion B2 is disposed so as to oppose the joining portion C2 at which the bottom face S3 and the side face S2 of the power receiving device 9 are in contact from the inside of the power receiving device main body 6.

Here, the joining portion means a portion including a ridge line and the vicinity thereof, which are formed by two surfaces being in contact with each other. Specifically, the joining portion C1 means a portion including a ridge line and the vicinity thereof, which are formed by the face S1 and the face S3 being in contact with each other, and the joining portion C2 means a portion including a ridge line and the vicinity thereof, which are formed by the face S2 and the face S3 being in contact with each other.

For example, the connecting portions B1 and B2 are formed by bending the secondary coil L2. How to bend the secondary coil L2 is not particularly limited, and for example, as illustrated in FIG. 2, the secondary coil L2 may have a shape having two convex portions or concave portions of which a cross section is curved, or a shape in which the concave portion or the convex portion are bent so as to form a corner. The number of the concave portion and the convex portion are not limited two in the power receiving unit 5, as long as the portions are interposed between two or more planer portions, a single number of or a plural numbers of portions may exist.

[Second Embodiment]

Figure 4:
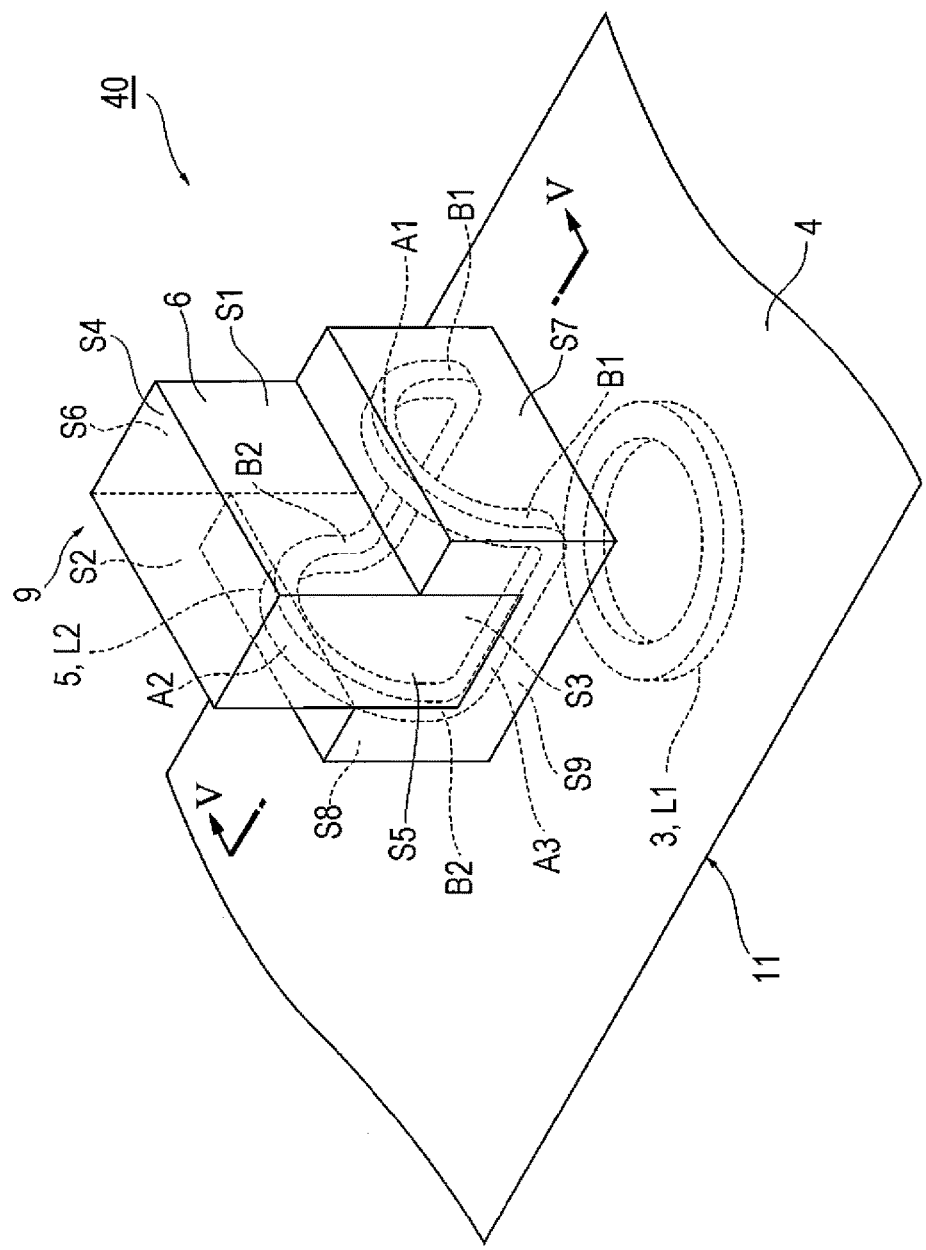
FIG. 4 is a perspective view of a wireless power transmission device according to a second embodiment of the present invention.
Figure 5:
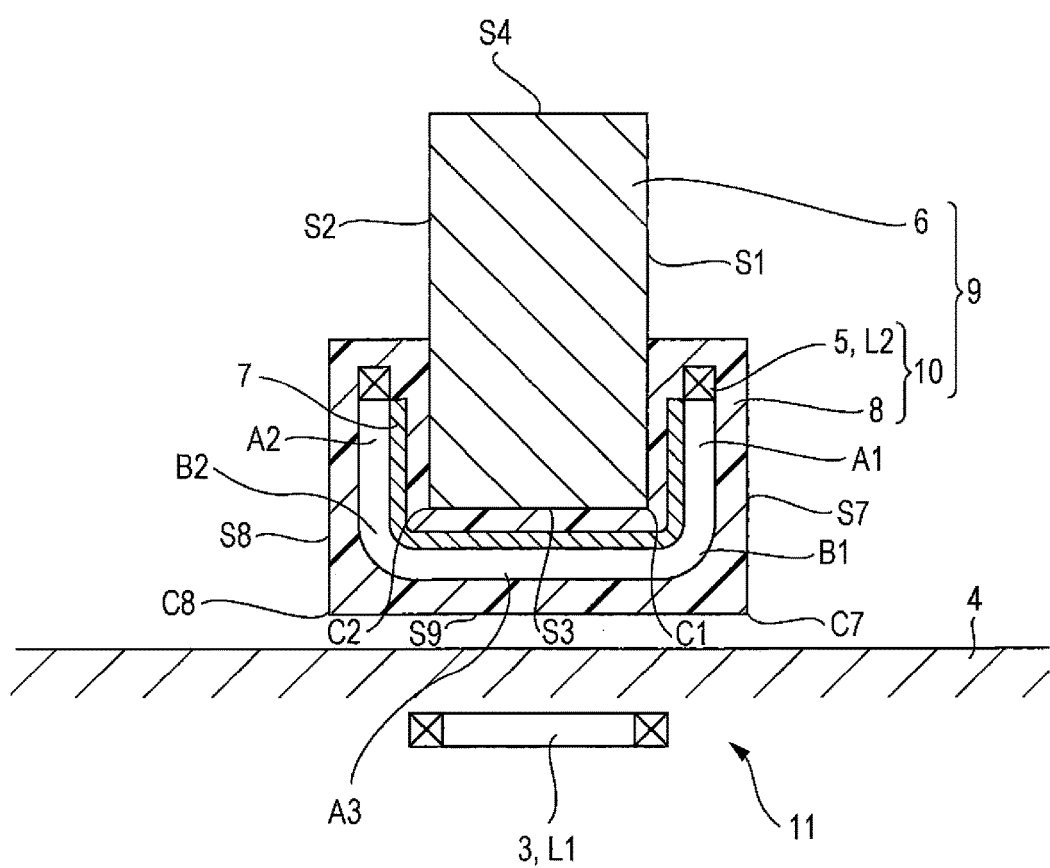
FIG. 5 is a cross-sectional view taken along a cutting line V-V of the wireless power transmission device according to the second embodiment of the present invention.

FIG. 4 is a perspective view of a wireless power transmission device according to a second embodiment of the present invention, and FIG. 5 is a cross-sectional view taken along a cutting line V-V of the wireless power transmission device according to the second embodiment of the present invention. The wireless power transmission device 40 according to the second embodiment, illustrated in FIGS. 4 and 5 includes a power receiving device 9 according to the present invention and a power feeding device 11.

As illustrated in FIGS. 4 and 5, the outer shape of the power receiving device main body 6 is a rectangular parallelepiped having six faces. The power receiving device 9 has a power receiving device main body 6, and a power receiving unit package 10 in which the secondary coil L2 is packaged by a resin 8 or the like. In the present embodiment, the U-shaped power receiving unit package 10 is attached to the outside of the power receiving device main body 6. The secondary coil L2 is disposed along two faces S7 and S9 which form the outer shape of the power receiving unit package 10 and are not parallel to each other and two faces S8 and S9 which form the outer shape of the power receiving unit package 10 and are not parallel to each other. If the secondary coil L2 is located along at least two surfaces which are not parallel to each other, even if the secondary coil L2 has a part located along surfaces (face S7 and face S8) which are parallel to each other, it is possible to achieve the effect of the present invention. Further, the secondary coil L2 has portions A1, A2 and A3 respectively located along three faces S7, S8, and S9 of the power receiving unit package 10. The face S9 is a bottom face of the power receiving unit package 10, the faces S7 and S8 are the side face of the power receiving unit package 10 adjacent to the face S9, and the faces S7, S9, and S8 are continuously disposed in this order. In the present embodiment, a part of the surfaces which form the outer shape of the power receiving device 9 corresponds to the faces which form the outer shape of the power receiving unit package 10. Although the surfaces receiving power transmission from the power feeding device 11 are the faces S1, S2, and S3 of the power receiving device main body 6 among the surfaces which form the outer shape of the power receiving device 9 in the first embodiment, in the present embodiment, the faces S7, S8, and S9 of the power receiving unit package 10 are the surfaces receiving power transmission from the power feeding device 11.

The portion A3 along the bottom face S9 and portion A1 or A2 respectively located along the side faces S7 and S8 are continuously disposed through a connecting portion B1 or B2. As described below, the connecting portions B1 and B2 are curved or bent along the outer shape of the power receiving device 9. In other words, in the secondary coil L2, the power receiving face may be disposed along two faces S7 and S9 which form the outer shape of the power receiving device 9 and are not parallel to each other and two faces S8 and S9 which form the outer shape of the power receiving device 9 and are not parallel to each other. From the viewpoint of power transmission efficiency, it is preferable that a magnetic body 7 be provided in a faces opposed to the bottom face S3 out of the faces of the secondary coil L2 so as to configure the power receiving unit 5.

The secondary coil L2 includes three planer portions A1, A2, and A3, a connecting portion B1 which is curved or bent (curved portion or bent portion) while being interposed between the planer portions A1 and A3, and a connecting portion B2 which is curved or bent (curved portion or bent portion) while being interposed between the planer portions A2 and A3. The planer portion A3 is opposed to the bottom face S9 of the power receiving device 9 and the planer portions A1 and A2 are opposed to the side faces S7 and S8 of the power receiving device 9 from the inside of the power receiving unit package 10. It is preferable that the planer portions A1, A2, and A3 be disposed so as to be respectively parallel to the faces S7, S8, and S9. In addition, the connecting portion B1 is disposed so as to oppose the joining portion C7 at which the bottom face S9 and the side face S7 of the power receiving device 9 are in contact from the inside of the power receiving unit package 10 and the connecting portion B2 is disposed so as to oppose the joining portion C8 at which the bottom face S9 and the side face S8 of the power receiving device 9 are in contact from the inside of the power receiving unit package 10.

In the power receiving devices according to the first and second embodiments, "the state in which the power receiving unit is disposed along two or more surfaces which form the outer shape of the power receiving device and are not parallel to each other", is for example, as described above, a state in which three planer portions A1, A2, and A3 are respectively located along the faces S7, S8, and S9, and two connecting portions B1 and B2 are along the outer shapes of the joining portions C7 and C8. As long as there is no practical problems in the power transmission efficiency, a part of the planer portions A1, A2, and A3 may have a curved portion or an inclined portion, or the planer portions A1, A2, and A3 themselves may be curved to be a smooth convex shape or concave shape with respect to the faces S1, S2, and S3, or the faces S7, S8, and S9.

In the first and second embodiments, the outer shape of the power receiving device main body 6 is a rectangular parallelepiped, but is not limited thereto. Further, one surface forming the outer shape of the power receiving device main body 6 is not limited to one flat face, and examples include one including partially two or more flat faces having different normal vectors, one including two or more curved faces or bent faces in a part, or one including both of these. Further, although the outer shape of the power receiving unit package 10 is a rectangular parallelepiped or a U-shape, it is not limited thereto. With respect to the outer shape of the power receiving unit package 10, it is preferable that the surface side of the power receiving device main body 6 have a shape formed along the outer shape of the power receiving device main body 6. The surfaces other than the surfaces of the power receiving device main body 6 side of the power receiving unit package 10 include one including two or more flat faces having different normal vectors in a part, one including two or more curved faces or bent faces in a part, or one including both of these. The power receiving device main body 6 and the power receiving unit package 10 can have one surface shape described above, within a range forming a surface of the power receiving device in the present invention. One surface of the power receiving device in the present invention is a surface (for example, a front face, a back face (a rear face), a top face, a bottom face, a side face, and the like) which can be pointed by specifying the position, in a form in which the power receiving device is commonly place or commonly used.

If the secondary coil L2 is in a state of being disposed along two or more surfaces which form the outer shape of the power receiving device 9 and are not parallel to each other, an angle for bending the secondary coil L2 is not particularly limited. As described above, the magnetic body 7 may be disposed in the secondary coil L2, and the planer portions A1 and A2 may be inverted in the part of the connecting portion B1 and B2. The magnetic body 7 is provided and the direction of a current flowing through the planer portions A1 and A2 is inverted, thereby suppressing the occurrence of a magnetic flux in the opposite direction to that of the magnetic flux linking with the planer portion A3, in the planer portions A1 and A2, and suppressing a decrease in power transmission efficiency.

When the magnetic body 7 is not disposed in the secondary coil L2, or the planer portions A1 and A2 are not inverted with respect to the planer portion A3, it is preferable that the angle for bending the secondary coil L2 be 90° or more and less than 180° as an angle between a virtual face including the planer portion A3 and a virtual face including the planer portion A1, or an angle between a virtual face including the planer portion A3 and a virtual face including the planer portion A2. If the angle between the virtual face including the planer portion A3 and the virtual face including the planer portion A1, or the angle between the virtual face including the planer portion A3 and the virtual face including the planer portion A2 is less than 90°, the magnetic field generated in the planer portions A1 and A2 acts in the direction to cancel the magnetic field generated in the planer portion A3. When the angle between the virtual face including the planer portion A3 and the virtual face including the planer portion A1, or the angle between the virtual face including the planer portion A3 and the virtual face including the planer portion A2 is 90° or more and less than 180°, the cancellation of the magnetic field as described above is reduced, and the power transmission efficiency is improved as compared to a case where the angle is less than 90°.

The type of the coil is not particularly limited, and examples include a coil of a planer shape in which a plurality of wires of a single layer are arranged in a horizontal direction, a coil in which a plurality of wires are arranged so as to be stacked in a vertical direction, a coil obtained by combining the arrangement shapes of these wires, and the like. From the viewpoint of the easiness of processing a coil and the compactness of equipment, the coil of a planer shape is preferable. The material of the coil is not particularly limited. For example, a material having a high conductivity, such as copper may be used.

If power of an appropriate amount can be supplied to the power receiving device 9, the size of the secondary coil L2 is not particularly limited, and from the viewpoint of preventing a reduction in power transmission efficiency in the case the position of the secondary coil L2 is shifted from the optimum power receiving position, it is preferable that the outer contour of an opposing face of the secondary coil L2 to the primary coil L1 be located further outward than the outer contour of an opposing face of the primary coil L1 to the secondary coil L2. In the state before the formation of the curved portion or bent portion, even if the secondary coil L2 and the primary coil L1 are any one of a substantially circular shape, a substantially polygonal shape, and a substantially elliptical shape, it is preferable that the secondary coil L2 and the primary coil L1 meet the above condition.

In the power receiving device 9, power is transmitted from the power feeding device 11 through the bottom face S3 by an electromagnetic induction between the primary coil L1 and the secondary coil L2. From the viewpoint of the power transmission efficiency, it is preferable that the primary coil L1 and the secondary coil L2 may be disposed so that the planer portion A3 of the secondary coil L2 and the primary coil L1 incorporated into the power feeding device 11 are opposed to each other in parallel.

In the first and second embodiments, even if the power receiving device 9 is disposed so that the primary coil L1 and the secondary coil L2 are opposed to each other through the side face S1 or S2, power is fed by inductive coupling between the primary coil L1 and the secondary coil L2. In other words, it is possible to feed power to the power receiving device 9 from a plurality of surfaces without using a plurality of coils, and to feed power while having a degree of freedom in the arrangements of the power receiving device 9 and the power feeding device 11. In the first and second embodiments, it is possible to feed power from three surfaces in one power receiving device 9.

Further, since there is one secondary coil L2, as compared to a case of using three coils so as to feed power from three surfaces, the number of wires to be drawn from the coil, the number of control devices connected to the wires, and the like can be reduced, there is no limitation in the size of the power receiving device 9.

In the present embodiment, the power feeding device 11 is not particularly limited as long as power can be fed to the power receiving device 9, and for example, the power feeding device 11 may have a scale in which S30 is a floor and S20 is a wall, or may be a compact device capable of moving.

Figure 6:
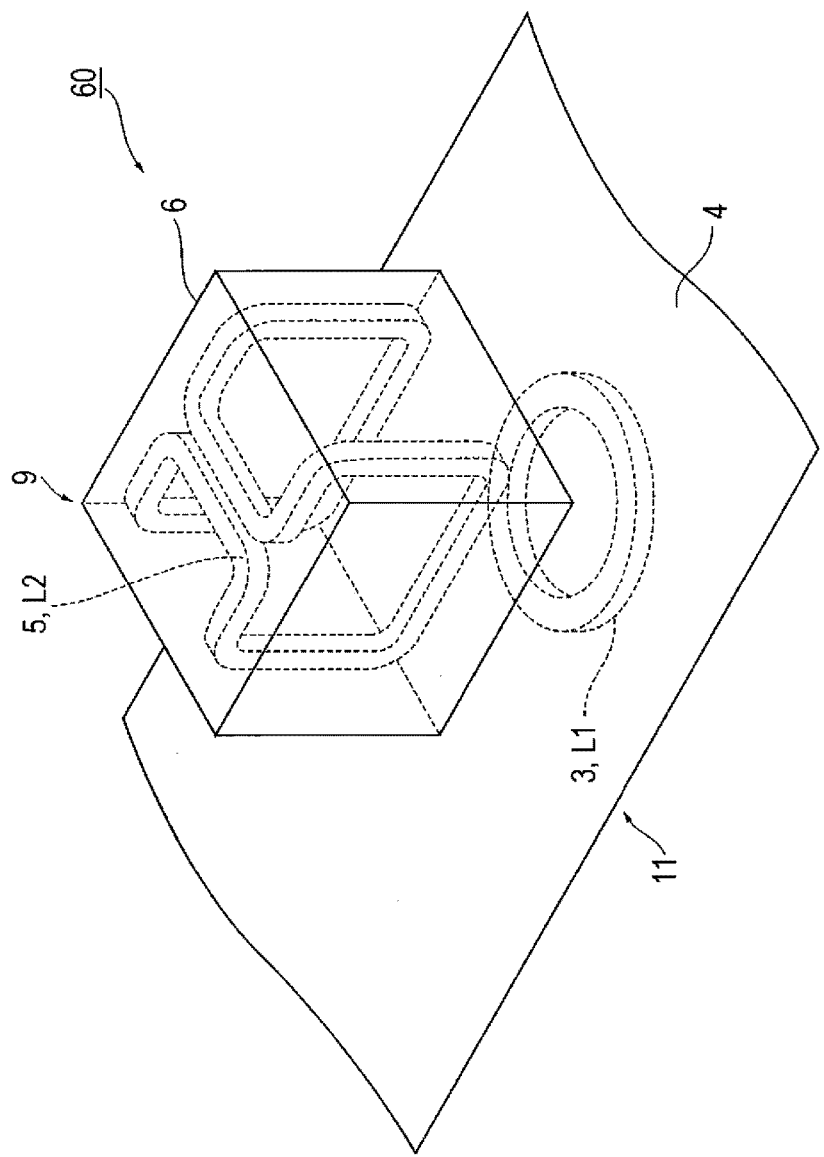
FIG. 6 is a perspective view illustrating another aspect of the wireless power transmission devices according to the first and second embodiments.

FIG. 6 is a perspective view illustrating another aspect of the wireless power transmission devices according to the first and second embodiments. The secondary coil L2 is provided to be located along four surfaces which form the outer shape of the power receiving device 9 in a wireless power transmission device 60 illustrated in FIG. 6. Since the faces S1 and S3, the faces S1 and S4, the faces S2 and S3, and the face S2 and S4 are respectively not parallel to each other, it is possible to feed power with a better degree of freedom in the arrangements of the power receiving device 9 and the power feeding device 11. In the present aspect, it is possible to feed power to one power receiving device 9 from four surfaces. Further, since there is one secondary coil L2, as compared to a case of using four coils so as to feed power from the four surfaces, the number of wires to be drawn from the coil, the number of control devices connected to the wires, and the like can be reduced, there is no limitation in the size of the power receiving device 9 and thus it is possible to further reduce the size of the power receiving device 9.

[Third Embodiment]

Figure 7:
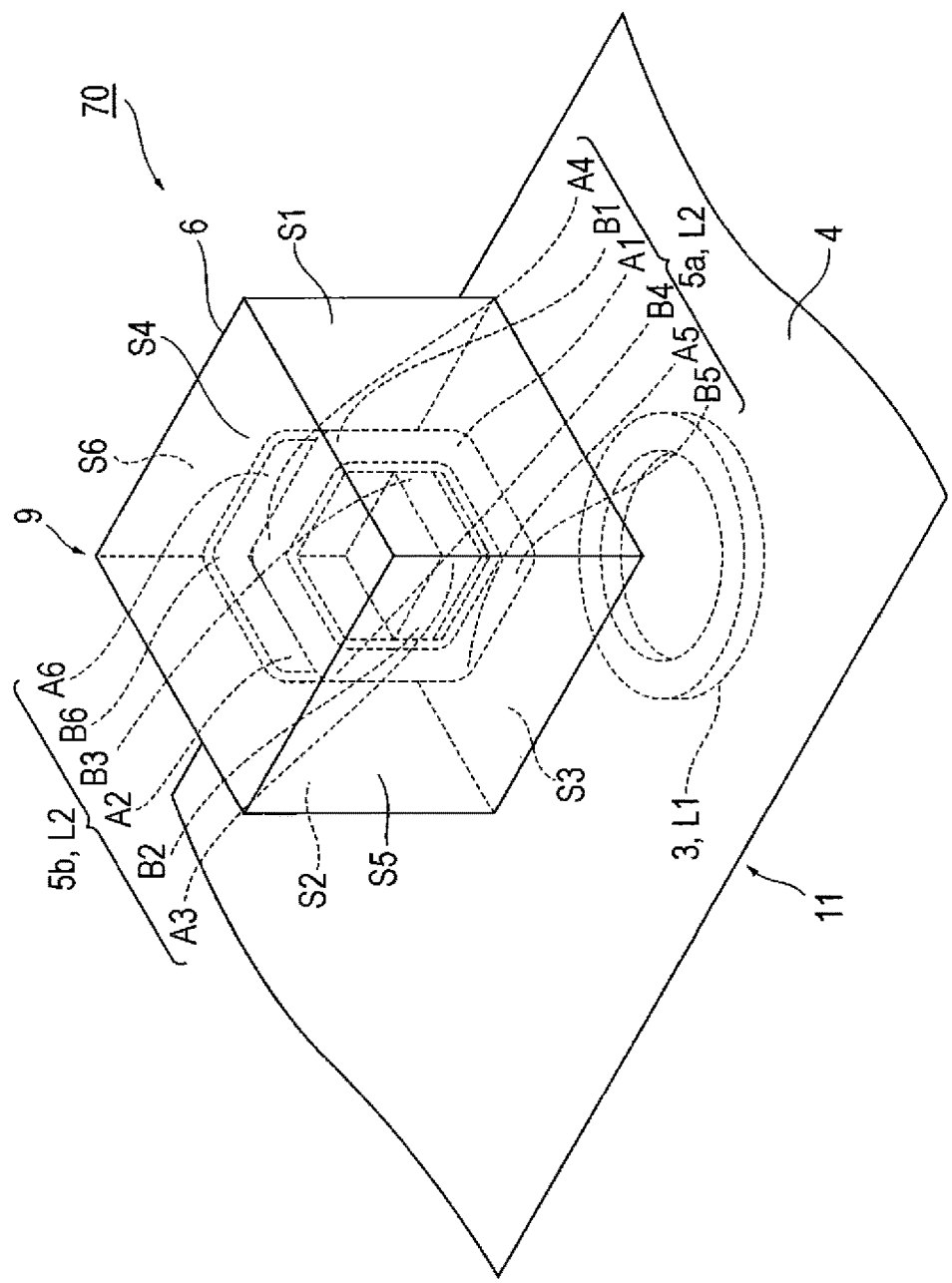
FIG. 7 is a perspective view of a wireless power transmission device according to a third embodiment of the present invention.

FIG. 7 is a perspective view of a wireless power transmission device according to a third embodiment of the present invention. A wireless power transmission device 70 according to the third embodiment, as illustrated in FIG. 7 is obtained by changing the shape and the number of the power receiving unit 5 of the power receiving device 9 in the first embodiment.

Two secondary coils L2 are incorporated into the power receiving device 9. Similarly to the first embodiment, the secondary coil L2 may include a magnetic body, and may be packaged by a resin. The secondary coil L2 constituting a power receiving unit 5a on one side includes portions A1, A4, and A5 respectively located along three faces S1, S4, and S5 which form the outer shape of the power receiving device 9 and are not parallel to each other, and the secondary coil L2 constituting a power receiving unit 5b on the other side includes portions A2, A3, and A6 respectively located along three faces S2, S3, and S6 which form the outer shape of the power receiving device 9 and are not parallel to each other. The face S4 is a top face of the power receiving device 9, the face S5 is a front face of the power receiving device 9, and the face S6 is a back face of the power receiving device 9. The faces S1, S2, S3, S4, S5, and S6 are continuously disposed as illustrated in FIG. 4.

In the power receiving unit 5a, the portions A4, A1 and A5 respectively located along the top face S4, the side face S1 and the front face S5 are continuously disposed through the connecting portions B1, B4 and B5. Further, in the power receiving unit 5b, the portions A3, A2 and A6 respectively located along the bottom face S3, the side face S2 and the back face S6 are continuously disposed through the connecting portions B2, B3 and B6. The connecting portion B1, B2, B3, B4, B5, and B6 are curved or bent along the outer shape of the power receiving device 9, as described below. In other words, the secondary coil L2 may be disposed so that the power receiving face may be located along three surfaces which form the outer shape of the power receiving device 9 and are not parallel to each other.

The secondary coil L2 constituting the power receiving unit 5a includes three planer portions A1, A4, and A5, and the connecting portions (curved portions or bent portions) B1, B4, and B5 which are curved or bent while being respectively interposed between the planer portions A1 and A4, between the planer portions A4 and A5, and the planer portions A1 and A5. Further, the secondary coil L2 constituting the power receiving unit 5b includes three planer portions A2, A3, and A6, and the connecting portions (curved portions or bent portions) B2, B3, and B6 which are curved or bent while being respectively interposed between the planer portions A2 and A3, between the planer portions A3 and A6, and the planer portions A2 and A6.

In the power receiving unit 5a, the planer portion A1, the planer portion A4 and the planer portion A5 are respectively opposed to the side face S1 of the power receiving device 9, the top face S4 of the power receiving device 9, and the front face S5 of the power receiving device 9, and it is preferable that the planer portions A1, A4, and A5 be disposed so as to be parallel to the faces S1, S4, and S5. Further, the connecting portion B1 is disposed so as to oppose the joining portion at which the top face S4 and the side face S1 of the power receiving device 9 are in contact, the connecting portion B4 is disposed so as to oppose the joining portion at which the top face S4 and the front face S5 of the power receiving device 9 are in contact with each other, and the connecting portion B5 is disposed so as to oppose the joining portion at which the front face S5 and the side face S1 of the power receiving device 9 are in contact, respectively.

In the power receiving unit 5b, the planer portion A2, the planer portion A3 and the planer portion A6 are respectively opposed to the side face S2 of the power receiving device 9 and the bottom face S3 of the power receiving device 9, and the back face S6 of the power receiving device 9, and it is preferable that the planer portions A2, A3, and A6 be disposed so as to be parallel to the faces S2, S3, and S6. Further, the connecting portion B2 is disposed so as to oppose the joining portion at which the side face S2 and the bottom face S3 of the power receiving device 9 are in contact with each other, the connecting portion B3 is disposed so as to oppose the joining portion at which the bottom face S3 and the back face S6 of the power receiving device 9 are in contact with each other, and the connecting portion B6 is disposed so as to oppose the joining portion at which the side face S2 and the back face S6 of the power receiving device 9 are in contact with each other, respectively.

In the present embodiment, the planer portions A1, A4, and A5 of the power receiving unit 5a have corners that are convex in the outer peripheral direction of the coil. Further, the planer portions A2, A3, and A6 of the power receiving unit 5b also have corners that are convex in the outer peripheral direction of the coil. Due to such a shape of the coil L2, simply, as compared to a case where a curved portion or bent portion is formed in the coil of a circular shape or an elliptical shape, it is easy to receive the magnetic flux from the coil L1 and power is transmitted efficiently.

By electromagnetic induction between the primary coil L1 and the secondary coil L2, power is transmitted to the power receiving device 9 from the power feeding device 11 through the bottom face S3, mainly by the power receiving unit 5b. Even if the power receiving device 9 is disposed so that the primary coil L1 and the secondary coil L2 are opposed to each other through the side faces S1 and S2, the top face S4, the front face S5 or the back face S6, power is supplied by inductive coupling between the primary coil L1 and the secondary coil L2.

According to the wireless power feeding system according to the present embodiment, as compared to the case where one of two secondary coils is opposed to one surface of the power receiving device 9, the number of surfaces capable of receiving power in the power receiving device 9 increases. This makes it possible to feed power having a degree of freedom in the arrangement of the power receiving device 9 and the power feeding device 11. In the present embodiment, since two power receiving units 5a and 5b capable of receiving power from three surfaces per each one are incorporated into the power receiving device 9, it is possible to feed power from six surfaces.

Further, since there are two secondary coils L2, as compared to a case where the power receiving device 9 includes six coils so as to have six surfaces to receive power, the number of wires to be drawn from the coil, the number of control devices connected to the wires, and the like can be reduced in the power receiving device 9, and there is no limitation in the size of the power receiving device 9 from these conditions.

Figure 8:
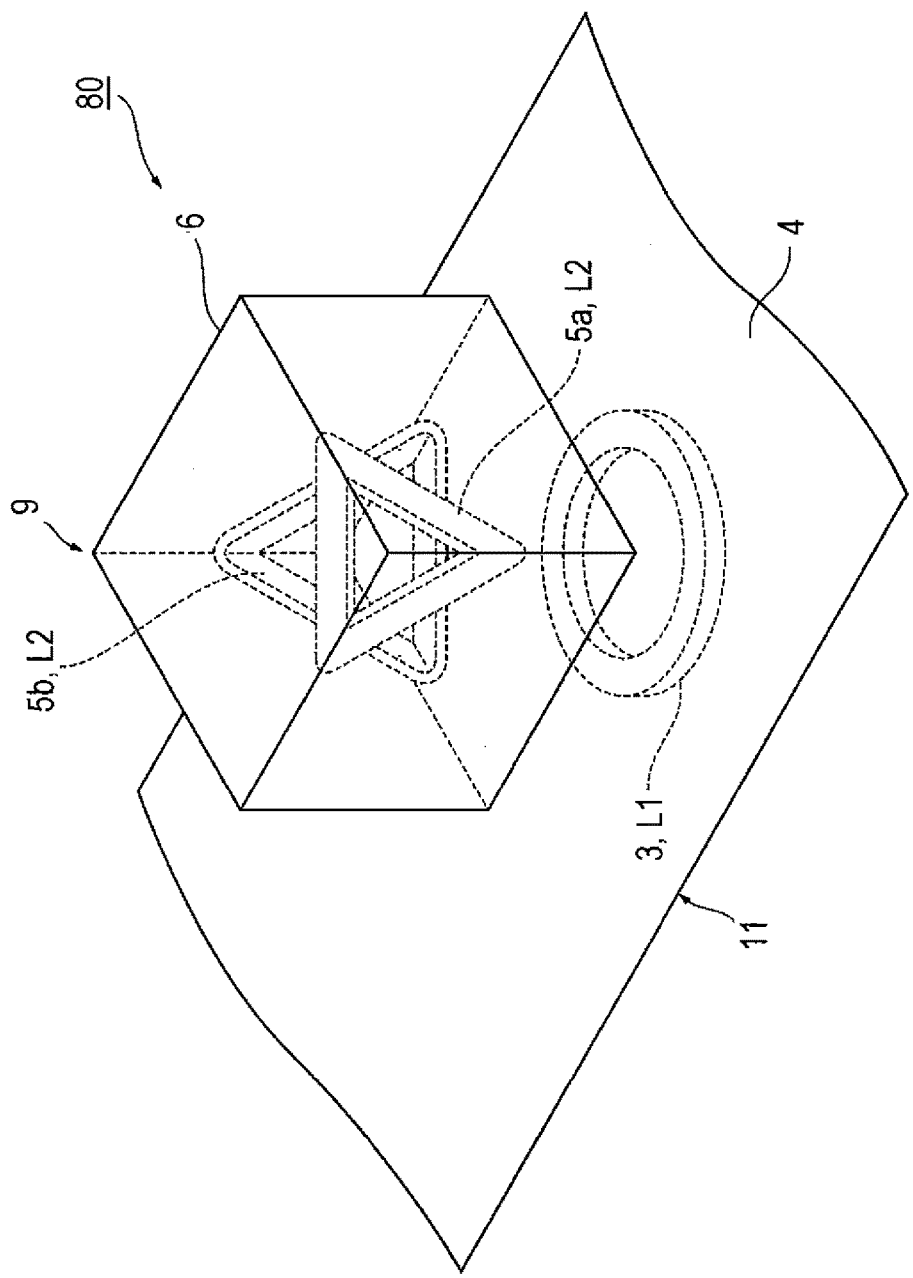
FIG. 8 is a perspective view illustrating another aspect of the wireless power transmission device according to the third embodiment.

FIG. 8 is a perspective view illustrating another aspect of the wireless power transmission device according to the third embodiment. Although the shape of the secondary coil L2 in the power receiving units 5a and 5b is a hexagonal shape in the wireless power transmission device 70 according to the third embodiment, as illustrated in the wireless power transmission device 80 illustrated in FIG. 8, the shapes of these secondary coil L2 are triangular shapes.

[Fourth Embodiment]

Figure 9:
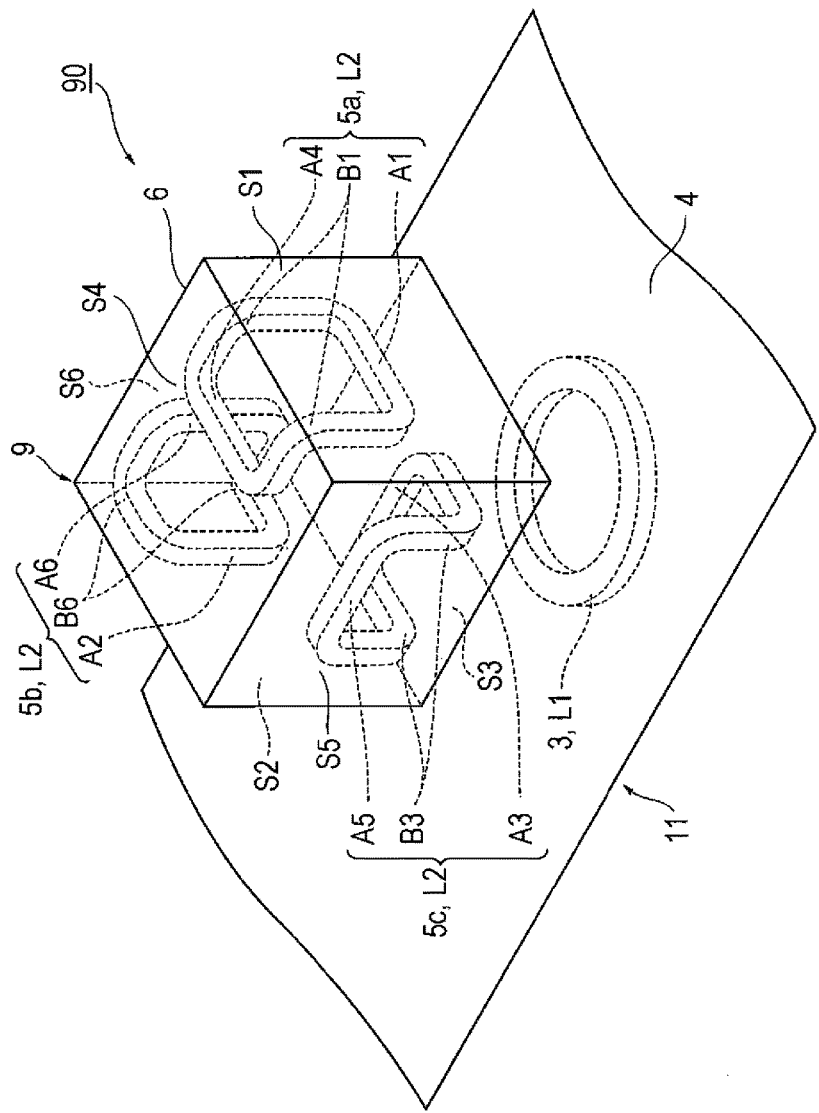
FIG. 9 is a perspective view of a wireless power transmission device according to a fourth embodiment of the present invention.

FIG. 9 is a perspective view of a wireless power transmission device according to a fourth embodiment of the present invention. A wireless power transmission device 90 according to the fourth embodiment, illustrated in FIG. 9, is obtained by changing the shape and the number of the secondary coils L2 of the power receiving device 9 in the first embodiment.

Three secondary coils L2 are incorporated into the power receiving device 9. Similarly to the first embodiment, the secondary coil L2 may include a magnetic body, and may be packaged by a resin. The secondary coil L2 constituting a power receiving unit 5a includes portions A1, and A4 respectively located along two faces S1, and S4 which form the outer shape of the power receiving device 9 and are not parallel to each other, the secondary coil L2 constituting a power receiving unit 5b includes portions A2, and A6 respectively located along two faces S2, and S6 which form the outer shape of the power receiving device 9 and are not parallel to each other, and the secondary coil L2 constituting a power receiving unit 5c includes portions A3, and A5 respectively located along two faces S3, and S5 which form the outer shape of the power receiving device 9 and are not parallel to each other.

In the power receiving unit 5a, a portion A1 located along the side face S1 and a portion A4 located along the top face S4 are continuously disposed through a connecting portion B1. In the power receiving unit 5b, a portion A2 located along the side face S2 and a portion A6 located along the back face S6 are continuously disposed through a connecting portion B6. In the power receiving unit 5c, a portion A3 located along the bottom face S3 and a portion A5 located along the front face S5 are continuously disposed through a connecting portion B3. The connecting portions B1, B3, and B6 are curved or bent along the outer shape of the power receiving device 9, as described below. In other words, the secondary coil L2 may be disposed so that the power receiving face may be located along two surfaces which form the outer shape of the power receiving device 9 and are not parallel to each other.

The coil L2 constituting the power receiving unit 5a includes two planer portions A1 and A4 and a connecting portion (curved portion or bent portion) B1 which is curved or bent while being interposed between the planer portions A1 and A4. The coil L2 constituting the power receiving unit 5b includes two planer portions A2 and A6 and a connecting portion (curved portion or bent portion) B6 which is curved or bent while being interposed between the planer portions A2 and A6. The coil L2 constituting the power receiving unit 5c includes two planer portions A3 and A5, and a connecting portion (curved portion or bent portion) B3 which is curved or bent while being interposed between the planer portions A3 and A5.

In the power receiving unit 5a, the planer portion A1 and the planer portion A4 are respectively opposed to the side face S1 of the power receiving device 9 and the top face S4 of the power receiving device 9, and it is preferable that the planer portions A1 and A4 be disposed so as to be parallel to the faces S1 and S4. Further, the connecting portion B1 is disposed so as to oppose a joining portion at which the top face S4 and the side face S1 of the power receiving device 9 are in contact.

In the power receiving unit 5b, the planer portion A2 and the planer portion A6 are respectively opposed to the side face S2 of the power receiving device 9 and the back face S6 of the power receiving device 9, and it is preferable that the planer portions A2 and A6 be disposed so as to be parallel to the faces S2 and S6. Further, the connecting portion B6 is disposed so as to oppose a joining portion at which the side face S2 and the back face S6 of the power receiving device 9 are in contact with each other.

In the power receiving unit 5c, the planer portion A3 and the planer portion A5 are respectively opposed to the bottom face S3 of the power receiving device 9 and the front face S5 of the power receiving device 9, and it is preferable that the planer portions A3 and A5 be disposed so as to be parallel to the faces S3 and S5. Further, the connecting portion B3 is disposed so as to oppose a joining portion at which the bottom face S3 and the front face S5 of the power receiving device 9 are in contact with each other.

By electromagnetic induction between the primary coil L1 and the secondary coil L2, power is transmitted to the power receiving device 9 from the power feeding device 11 through the bottom face S3, mainly by the power receiving unit 5c. Even if the power receiving device 9 is disposed so that the primary coil L1 and the secondary coil L2 are opposed to each other through the side faces S1 and S2, the top face S4, the front face S5 or the back face S6, power is fed by inductive coupling between the primary coil L1 and the secondary coil L2.

According to the wireless power feeding system according to the present embodiment, as compared to when one of three secondary coils is opposed to one surface of the power receiving device 9, the number of surfaces capable of receiving power in the power receiving device 9 increases, and this makes it possible to feed power having a degree of freedom in the arrangement of the power receiving device 9 and the power feeding device 11. In the present embodiment, since three power receiving units 5a, 5b and 5c capable of receiving power from two surfaces per each one are incorporated into the power receiving device 9, it is possible to feed power from six surfaces.

Further, since there are three secondary coils L2, for example, as compared to a case where the power receiving device 9 includes six coils so as to have six surfaces to receive power, the number of wires to be drawn from the coil, the number of control devices connected to the wires, and the like can be reduced in the power receiving device 9, and there is no limitation in the size of the power receiving device 9 from these conditions.

Further, in the present embodiment, since the power receiving units 5a, 5b, and 5c are formed of secondary coils L2 of a L-shape, small amount of a magnetic flux is generated in an opposite direction with respect to the linkage magnetic flux from the power feeding unit 3 and one surface of the coil is disposed so as to oppose one face of the power receiving device 9, and thus it is possible to most effectively achieve both of increasing power transmission efficiency and suppressing the enlargement of the equipment.

[Fifth Embodiment]

Figure 10:
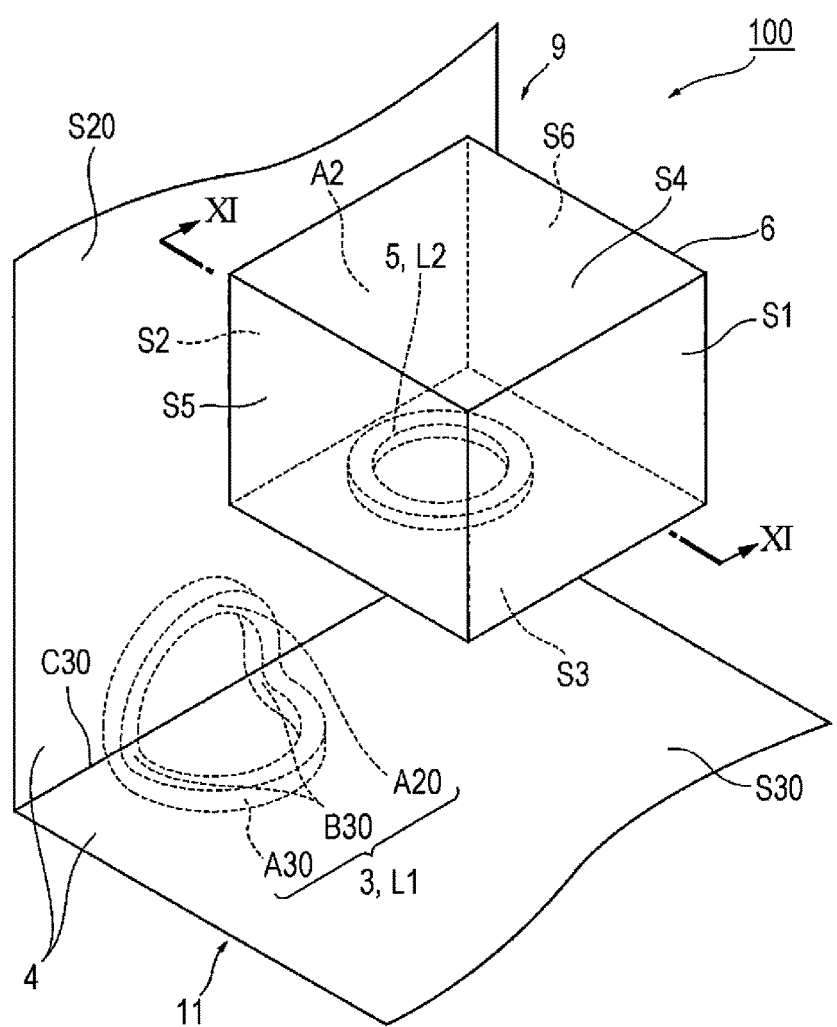
FIG. 10 is a perspective view of a wireless power transmission device according to a fifth embodiment of the present invention.
Figure 11:
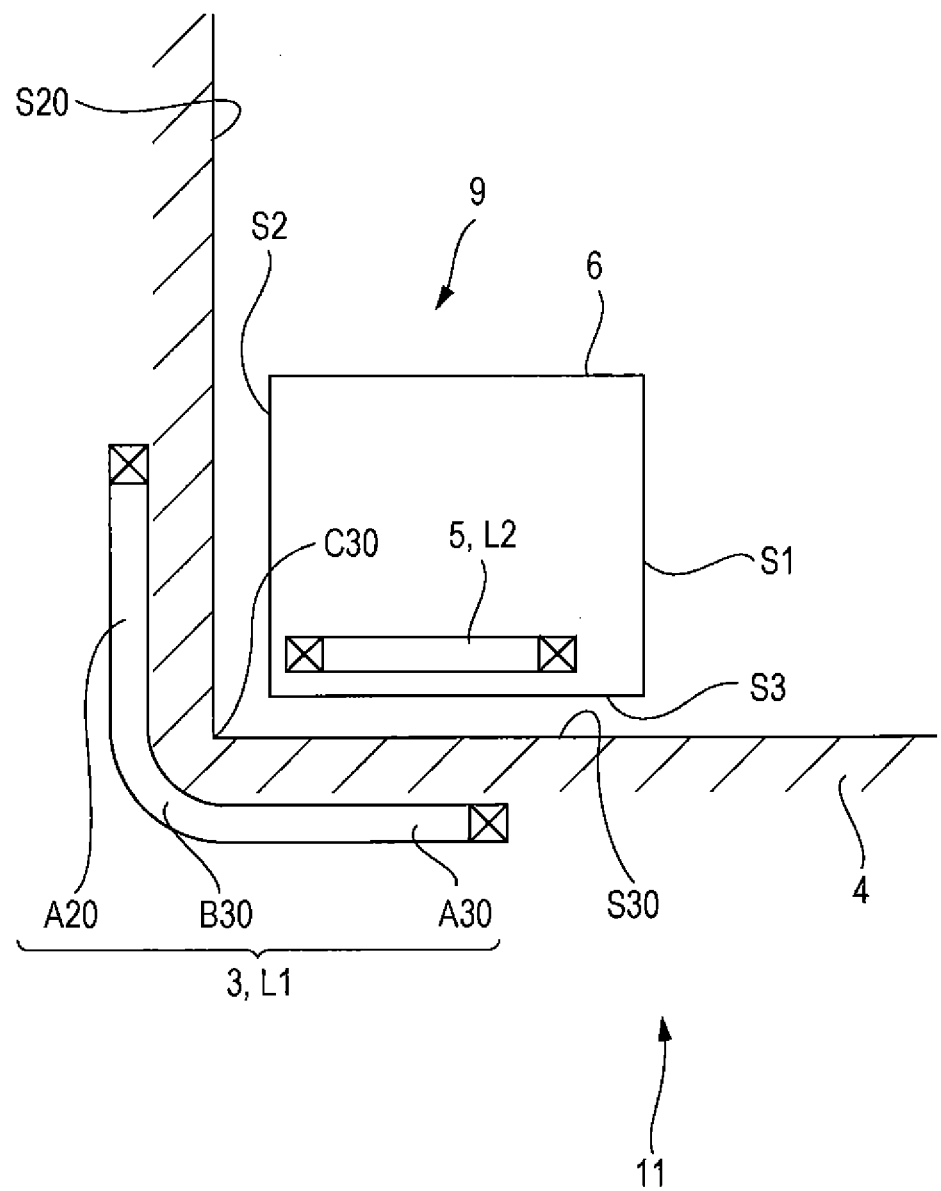
FIG. 11 is a cross-sectional view taken along a cutting line XI-XI of the wireless power transmission device according to the fifth embodiment of the present invention.

FIG. 10 is a perspective view of a wireless power transmission device according to a fifth embodiment of the present invention, and FIG. 11 is a cross-sectional view taken along a cutting line XI-XI of the wireless power transmission device according to the fifth embodiment of the present invention. The wireless power transmission device 100 according to the fifth embodiment, illustrated in FIGS. 10 and 11, includes a power feeding device 11 according to the present invention and a power receiving device 9. The power feeding device 11 has a power feeding device main body 4 and a power feeding unit 3, and the power receiving device 9 includes a power receiving device main body 6 and a power receiving unit 5. The power feeding unit 3 is constructed of the primary coil L1, and the power receiving unit 5 is constructed of the secondary coil L2, and by the power feeding unit 3 and the power receiving unit 5 being electromagnetically coupled, the power feeding device 11 transmits power to the power receiving device 9.

[Power Feeding Device]

As illustrated in FIGS. 10 and 11, the power feeding device 11 has two or more surfaces, for example, the power receiving device 9 is in contact with two faces S20 and S30 among the two or more surfaces and the power receiving device 9 is placed on the two faces S20 and S30 so as to receive power. The face S30 is a surface (bottom face of the power feeding device 11) which is to be opposed to the face S3 along which the secondary coil L2 of the power receiving device 9 is, and the face S20 is a surface (side face of the power feeding device 11) adjacent to the face S30. The face S30 and the face S20 form a part of the outer shape of the power feeding device, and the faces S30 and S20 are not parallel to each other. The primary coil L1 is disposed along the faces S30 and S20 which have such a positional relationship. Here, the state "along the surface" means that the distances from the surfaces of the power feeding device 11 and a positional relationship between the surfaces of the power feeding device 11 are insured to an extent that the primary coil L1 can form an area capable of feeding power to the power receiving device 9 in the surface of the power feeding device 11. If the primary coil L1 is located along at least two surfaces which are not parallel to each other, even if the primary coil L1 has a part located along surfaces which are parallel to each other, it is possible to achieve the effect of the present invention. The power feeding device 11 includes a power feeding device main body 4, and a power feeding unit package (not shown) in which the primary coil L1 is packaged by a resin 8 or the like. The power feeding unit package is incorporated into the power feeding device main body 4 having two or more surfaces. In the present embodiment, the surfaces which form the outer shape of the power feeding device 11 correspond to the surfaces which form the outer shape of the power feeding device main body 4.

The primary coil L1 includes a winding portion formed by wound conductive wires and an opening portion which is surrounded by the winding portion and has two opening ends opposed to each other, and has portions A20 and A30 respectively located along the faces S20 and S30. A magnetic body may be included. The portions A20 and A30 respectively located along a bottom face S30 and a side face S20 of the power feeding unit 3 are continuously disposed through the connecting portion B30. As described below, the connecting portion B30 is curved or bent along the outer shape of the power feeding device. In other words, in the primary coil L1, the power feeding face may be disposed along two faces S30 and S20 which form the outer shape of the power feeding device 11 and are not parallel to each other. In the present embodiment, "the power feeding face of the coil" means "opening portion of the coil".

Specifically, the primary coil L1 includes two planer portions A20 and A30, and one connecting portion B30 which is curved or bent (curved portion or bent portion) while being interposed between the planer portions. The planer portion A30 of the power feeding unit 3 is opposed to the bottom face S30 of the power feeding device 11, and the planer portion A20 is opposed to the side face S20 of the power feeding device 11, and it is preferable that the planer portions A20 and A30 be disposed so as to be parallel to the faces S20 and S30. Further, the connecting portion B30 is disposed to oppose a joining portion C30 at which the bottom face S30 and the side face S20 of the power feeding device 11 are in contact with each other.

Here, the joining portion C30 at which the side face S20 and the bottom face S30 are in contact with each other means a portion including a ridge line and the vicinity thereof, which are formed by the side face S20 and the bottom face S30 being in contact with each other.

In the power feeding device according to the fifth embodiment, "the state in which the power feeding unit is disposed along two or more surfaces which form the outer shape of the power feeding device and are not parallel to each other", as described above, is the state in which two planer portions A20 and A30 in the power feeding unit 3 are respectively located along the faces S20 and S30, one connecting portion B30 is located along the shape of the outer shape of the joining portion C30. As long as there are no practical problems in the power transmission efficiency, a part of the planer portions A20 and A30 may have a curved portion, or the planer portions A20 and A30 themselves may be curved to be a smooth convex shape or concave shape with respect to the faces S20 and S30.

In the present embodiment, one surface forming the outer shape of the power feeding device 11 is not limited to one flat face, and examples include one including two or more flat faces having different normal vectors in a part, one including two or more curved faces or bent faces in a part, or one including both of these. Similarly to the description in the power receiving device 9 in the first to fourth embodiments, when the surface of the power feeding device 11 corresponds to the surface of the power feeding device main body 4 or the surface of the power feeding unit package 10, the same surface as one surface forming the outer shape of the power feeding device 11 can be used for one surface forming the outer shape of the power feeding device main body 4 and one surface forming the outer shape of the power feeding unit package 10. However, the surface of the power feeding device 11, the surface of the power feeding device main body 4, and the surface of power feeding unit package 10 can have surface shapes described above within a range for forming one surface of the power feeding device in the present invention. The one surface of the power feeding device in the present invention is a surface (for example, a front face, a back face (a rear face), a top face, a bottom face, a side face, and the like) which can be pointed by specifying the position, in a form in which the power feeding device is commonly placed or commonly used.

If the primary coil L1 is in a state of being disposed along two or more surfaces which form the outer shape of the power feeding device 11 and are not parallel to each other, an angle for bending the primary coil L1 is not particularly limited. The magnetic body 7 may be disposed in a surface, which is opposed to the side face S20 and the bottom face S30 of the power feeding device 11, of the primary coil L1 or the planer portions A20 and A30 may be inverted in the part of the connecting portion B30, of the primary coil L1. It is possible to suppress, in one side of the planer portions A20 or A30, the occurrence of a magnetic flux in the opposite direction to that of the magnetic flux generated in other side of the surface, and to suppress a decrease in power transmission efficiency, by providing the magnetic body 7 or by inverting the direction of a current flowing through the planer portions A20 or A30.

As described above, when the magnetic body 7 is not disposed in the primary coil L1, or the planer portions A20 or A30 is not inverted, it is preferable that the angle for bending the primary coil L1 be 90° or more and less than 180° as an angle between a virtual face including the planer portion A20 and a virtual face including the planer portion A30. If the angle between the virtual face including the planer portion A20 and the virtual face including the planer portion A30 is less than 90°, the magnetic field generated in the planer portion A20 or A30 acts in the direction to cancel the magnetic field generated in the planer portion A30 or A20. When the angle between the virtual face including the planer portion A20 and the virtual face including the planer portion A30 is 90° or more and less than 180°, the cancellation of the magnetic field as described above is reduced, and the power transmission efficiency is improved as compared to the case where the angle is less than 90°.

The type of the coil is not particularly limited, and examples include a coil of a planer shape in which a plurality of wires of a single layer are arranged in a horizontal direction, a coil in which a plurality of wires are arranged so as to be stacked in a vertical direction, a coil obtained by combining these arrangement shapes of these wires, and the like. From the viewpoint of the easiness of processing a coil and the compactness of equipment, the coil of a planer shape is preferable. The material of the coil is not particularly limited. For example, a material having a high conductivity, such as copper may be used.

If the secondary coil L2 incorporated into the power receiving device 9 is opposed to the planer portion A30 of the primary coil L1 through the bottom face S30 of the power feeding device 11, power is transmitted from the power feeding device 11 to the power receiving device 9 by the electromagnetic induction between the primary coil L1 and the secondary coil L2. Even if the arrangement of the power receiving device 9 is changed so that S1 or S2 is the bottom face and the S3 is opposed to the S20 of the power feeding device 11, or the arrangement of the power feeding device 11 is changed so that S20 is a bottom face and is opposed to the S3 of the power receiving device 9, the planer portion A20 of the primary coil L1 and the secondary coil L2 are opposed to each other, and power is fed from the power feeding device 11 to the power receiving device 9 by the electromagnetic induction between the primary coil L1 and the secondary coil L2. In other words, according to the power feeding device 11 according to the present embodiment, power can be fed on two surfaces of the power feeding device 11 from one primary coil L1, and power can be fed while having a degree of freedom in the arrangement of the power receiving device 9 and the power feeding device 11.

Further, since it is configured so that power can be fed on two surfaces of the power feeding device 11 from one primary coil L1, as compared to a case of using two coils, the number of wires to be drawn from the coil, the number of control devices connected to the wires, and the like can be reduced, and there is no limitation in the size of the power feeding device 11 from these conditions.

[Sixth Embodiment]

Figure 12:
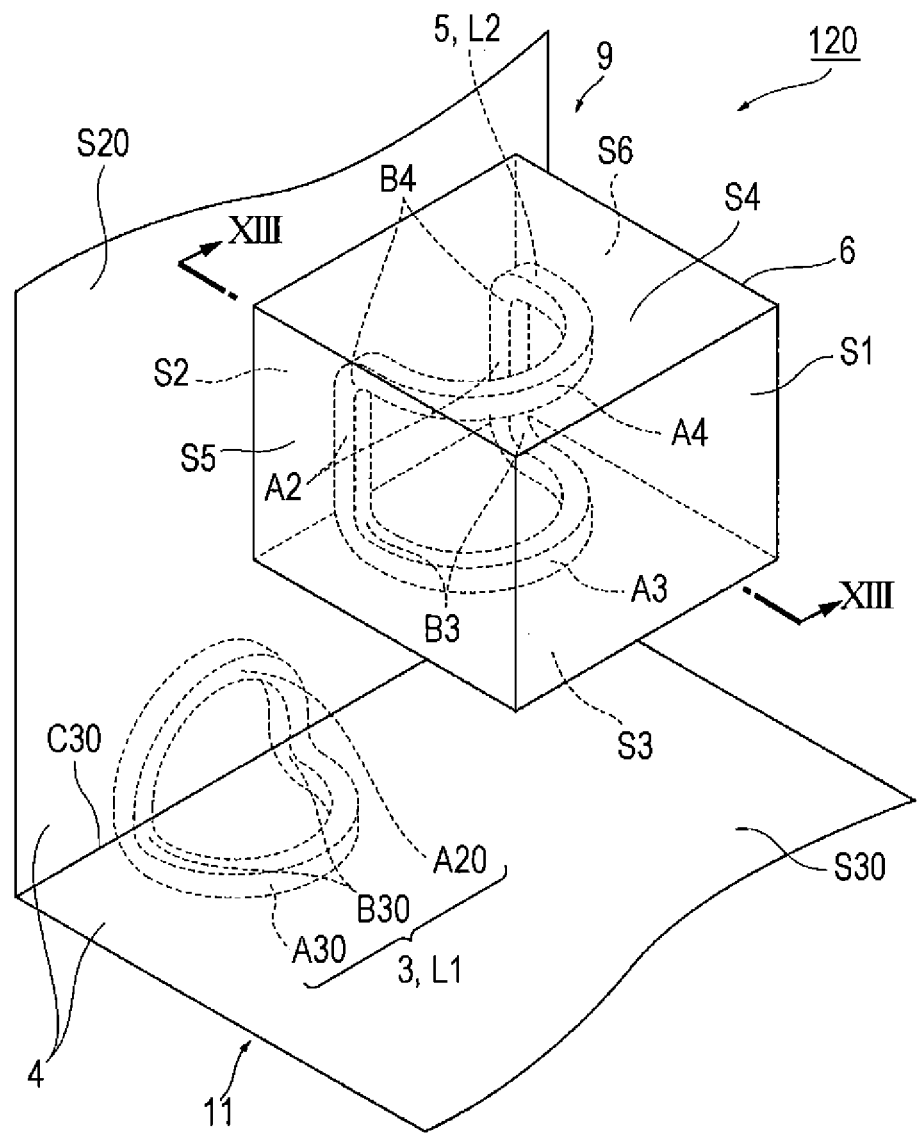
FIG. 12 is a perspective view of a wireless power transmission device according to a sixth embodiment of the present invention.
Figure 13:
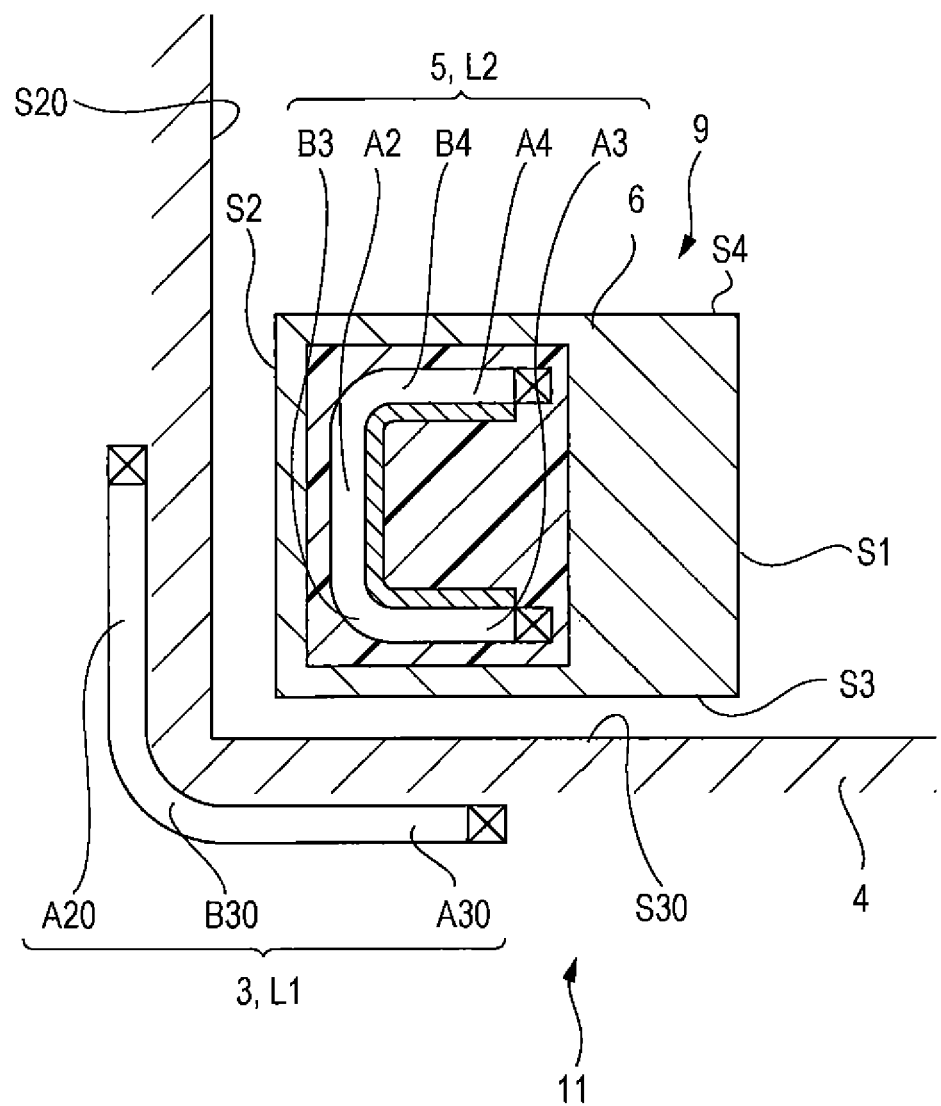
FIG. 13 is a cross-sectional view taken along a cutting line XIII-XIII of the wireless power transmission device according to the sixth embodiment of the present invention.

FIG. 12 is a perspective view of a wireless power transmission device according to a sixth embodiment of the present invention, and FIG. 13 is a cross-sectional view taken along a cutting line XIII-XIII of the wireless power transmission device according to the sixth embodiment of the present invention. A wireless power transmission device 120 according to the sixth embodiment, illustrated in FIGS. 12 and 13, includes a power receiving device which is the power receiving device 9 in the first embodiment, and a power feeding device which is the power feeding device 11 according to the fifth embodiment.

Even if the power receiving device 9 is disposed so that the primary coil L1 and the secondary coil L2 are opposed to each other through the side face S2 and the top face S4, power is fed by inductive coupling between the primary coil L1 and the secondary coil L2. Further, even if the arrangement of the power feeding device 11 is changed so that the side face S20 is located in the bottom face and opposed to the bottom face S3 of the power receiving device 9, power is fed by inductive coupling between the primary coil L1 and the secondary coil L2. In other words, it is possible to feed power to the power receiving device 9 from a plurality of surfaces without using a plurality of coils, and it is possible to feed power while having a degree of freedom in the arrangements of the power receiving device 9 and the power feeding device 11. In the present embodiment, it is possible to feed power from three surfaces in one power receiving device 9. Further, it is possible to feed power from two surfaces in one power feeding device 11. Further, since the primary coil L1 has an L-shape, even if there is a positional deviation of the power receiving device 9, it is possible to reduce the degradation of power transmission efficiency.

Further, as described above, the power feeding device 11 is capable of feeding power in two surfaces per one primary coil L1, and the power receiving device 9 is capable of receiving power in three surfaces per one secondary coil L2, as compared to a case where one of two primary coils L1 is opposed to one surface of the power feeding device 11 and a case where one of three secondary coils L2 is opposed to one surface of the power receiving device 9, the number of wires to be drawn from the coil, the number of control devices connected to the wires, and the like can be reduced, and there is no limitation in the size of the power feeding device 11 and the power receiving device 9 from these conditions.

Hitherto, although aspects has been described in the first to sixth embodiments in which one type of coils are used in the power receiving unit 5 or the power feeding unit 3, different shapes of coils may be combined and used. Further, although one power receiving unit 5 or one power feeding unit 3 is used in the first, second, fifth and sixth embodiments, a plurality of them may be used as in the third and fourth embodiments.

The shape of the coil is not particularly limited as long as the coil shape has a planer portion and a curved portion or bent portion including a winding portion and an opening portion, and may be a petal shape in which one edge of a plurality of planer portions is gathered toward one curved portion or bent portion other than the shapes described in the above embodiments.

According to the wireless power transmission devices according to the first to sixth embodiments, when the power receiving device 9 is a compact electric device such as a mobile phone, a plurality of power receiving devices 9 can be charged in one power feeding device 11. Further, even if there is a limited space in the power feeding device 11, there is no limitation in the arrangement direction of the power receiving device 9 to the power feeding device 11, and power can be fed even at a small place. However, applications are not limited thereto, as described below, the power receiving device 9 can be applied to the electric vehicle (FIG. 14), and the power feeding device 11 can be applied to a power feeding device for an electric vehicle (FIG. 15).

Figure 14:
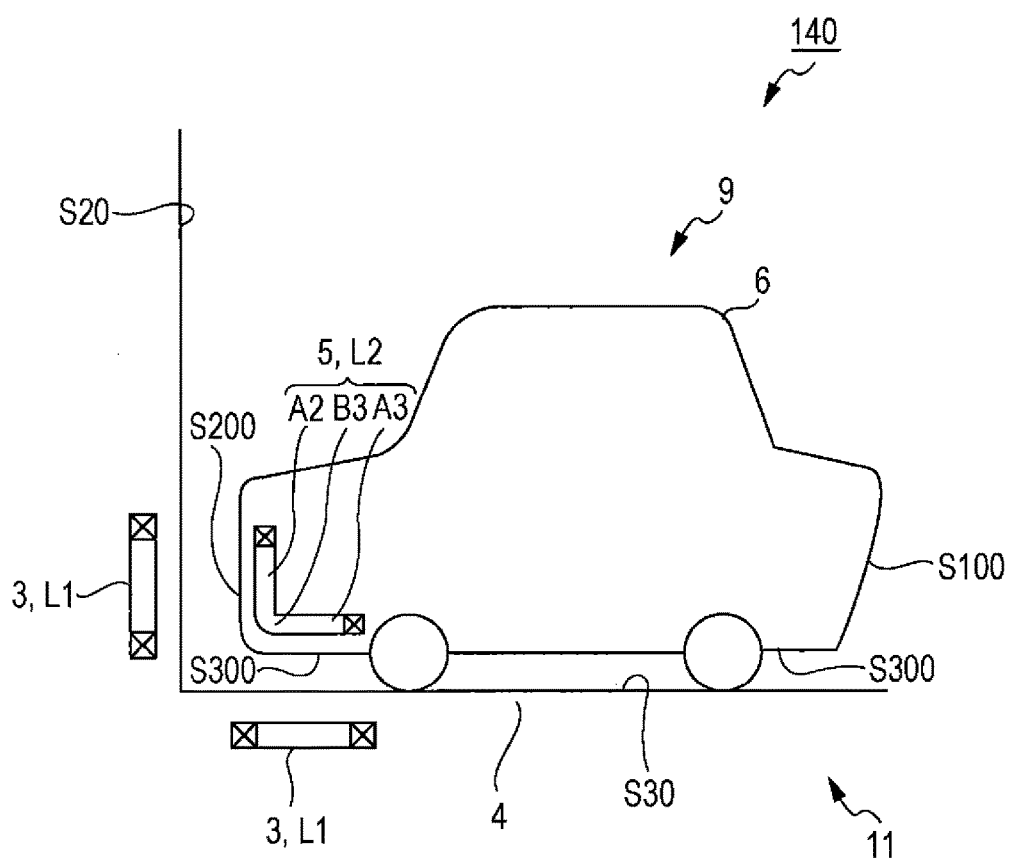
FIG. 14 is a cross-sectional view illustrating an aspect in which the power receiving device of the present invention is an electric vehicle.

FIG. 14 is a cross-sectional view illustrating an aspect in which the power receiving device of the present invention is an electric vehicle. The secondary coil L2 is provided in front of the power receiving device (electric vehicle) 9. In the secondary coil L2, the planer portion A3 along the bottom face S300 of the power receiving device main body (vehicle main body) 6 and the planer portion A2 along the front face S200 are curved or bent through the connecting portion B3. The bottom face S300 and the front face S200 are surfaces which form the outer shape of the power receiving device 9 and are not parallel to each other. Thus, in the power feeding device 11, even if the primary coil L1 of the planer shape is provided along the bottom face S30 of the power feeding device main body 4 or is provided along the side face S20 of the power feeding device main body 4, the power receiving device (electric vehicle) 9 is charged. In other words, it is possible to have a degree of freedom in the arrangement of the power receiving device 9 to the power feeding device 11. The secondary coil L2 can be provided not only in the front side but also in the rear side of the power receiving device (electric vehicle) 9, and in this case, may be disposed along the bottom face S300 and the rear face S100. Further, when the secondary coil L2 is disposed in the front side or in the rear side of the power receiving device (electric vehicle) 9, the same effect is achieved not only by disposing the secondary coil L2 along the bottom face S300 and the front face S200 or the bottom face S300 and the rear face S100, but also by disposing the secondary coil L2 along the bottom face S300 and the side face.

Figure 15:
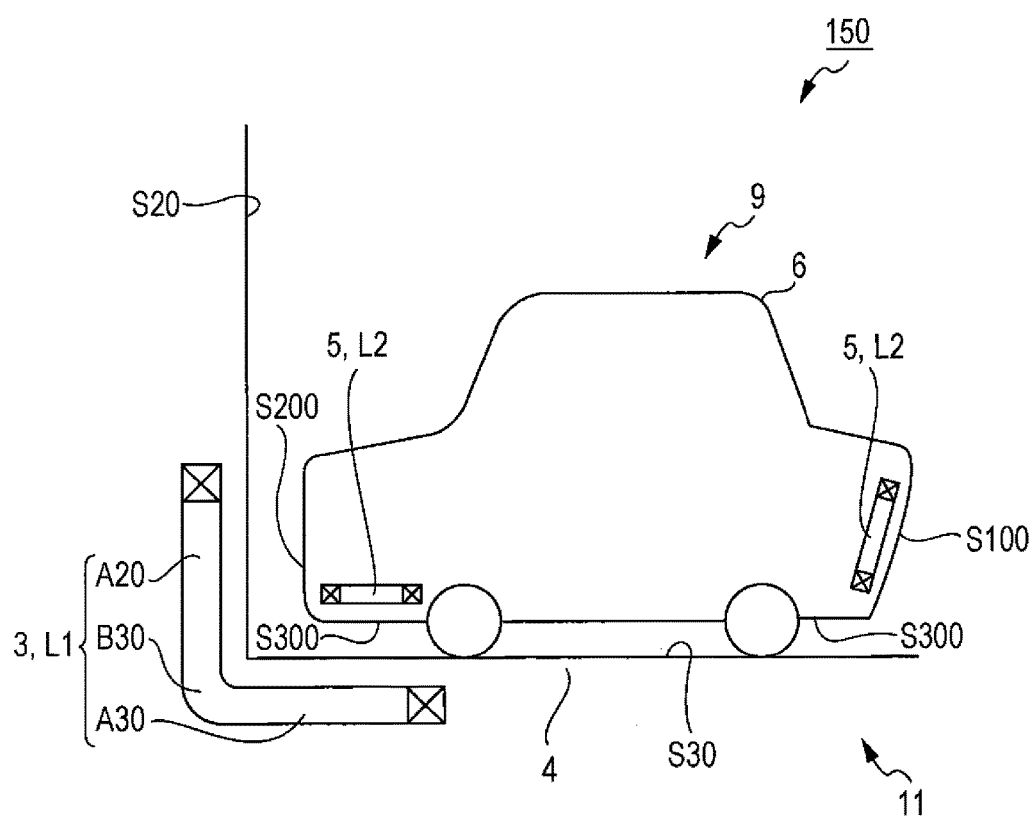
FIG. 15 is a cross-sectional view illustrating an aspect in which the power feeding device of the present invention is a power feeding device for an electric vehicle.

FIG. 15 is a cross-sectional view illustrating an aspect in which the power feeding device of the present invention is a power feeding device for an electric vehicle. A primary coil is provided in the power feeding device 11. In the primary coil L1, a planer portion A30 located along the bottom face S30 of the power feeding device main body 4 and a planer portion A20 located along the side face S20 are curved or bent through the connecting portion B30. The bottom face S30 and the side face S20 are surfaces which form an outer shape of the power feeding device 11 and are not parallel to each other. Thus, in the power receiving device (electric vehicle) 9, even if a secondary coil L2 of a planer shape is provided along the bottom face S300 of the power receiving device main body (vehicle main body) 6, or is provided along the rear face S100 of the power receiving device main body (vehicle main body) 6, it is possible to feed power to the power receiving device (electric vehicle) 9. In other words, it is possible to perform charging while having a degree of freedom in the arrangement of the power receiving device (electric vehicle) 9 with respect to the power feeding device 11. In addition, the power feeding device 11 described herein can feed power to the electric vehicle 9 represented by FIG. 14 and the electric vehicle obtained by mounting the secondary coil L2 represented by FIG. 14 in the electric vehicle 9 represented by FIG. 15 while having a degree of freedom in the arrangement of the electric vehicle 9 and the power feeding device 11.

Figure 16:
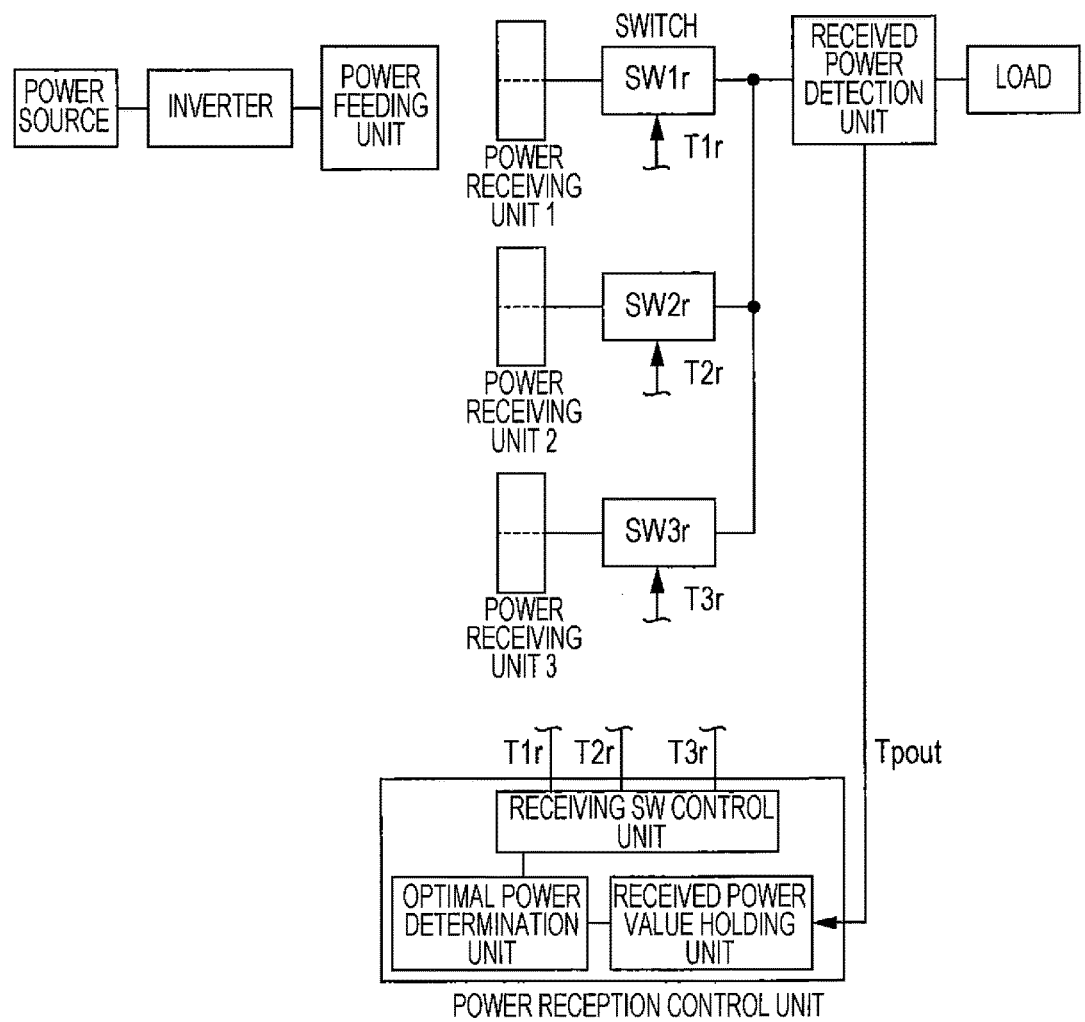
FIG. 16 is an example of a control circuit in the power receiving device according to the present embodiment.

Here, with reference to FIGS. 16 and 17, a power transmission method of a wireless power transmission device according to the present embodiment will be described. FIG. 16 is an example of a control circuit in the power receiving device according to the present embodiment. If power receiving units 1 to 3 receive power generated by receiving a magnetic flux from the power feeding unit and a received power detection unit detects the power, a power reception signal (Tpout) is transmitted to a power reception control unit. The power reception control unit includes a received power value holding unit, an optimal power determination unit, and a receiving SW control unit.

The receiving SW control unit transmits signals (T1r to T3r; hereinafter, referred to as power reception signals) corresponding to the respective combinations to turn ON/OFF a portion or all of switches SW1r to SW3 to the switches SW1r to SW3. The received power value holding unit holds information about ON/OFF signals which is transmitted to the switches SW1r to SW3, and information about power received by the power receiving units 1 to 3 corresponding thereto. The optimal power determination unit determines the combination of ON/OFF signals which makes the power received by the power receiving units 1 to 3 maximum, based on the determination result, the receiving SW control unit transmits power reception signals (T1r to T3r) corresponding thereto to the switches SW1r to SW3r. Thus, the power receiving device can receive power so that the power received by the power receiving units 1 to 3 is a maximum.

Figure 17:
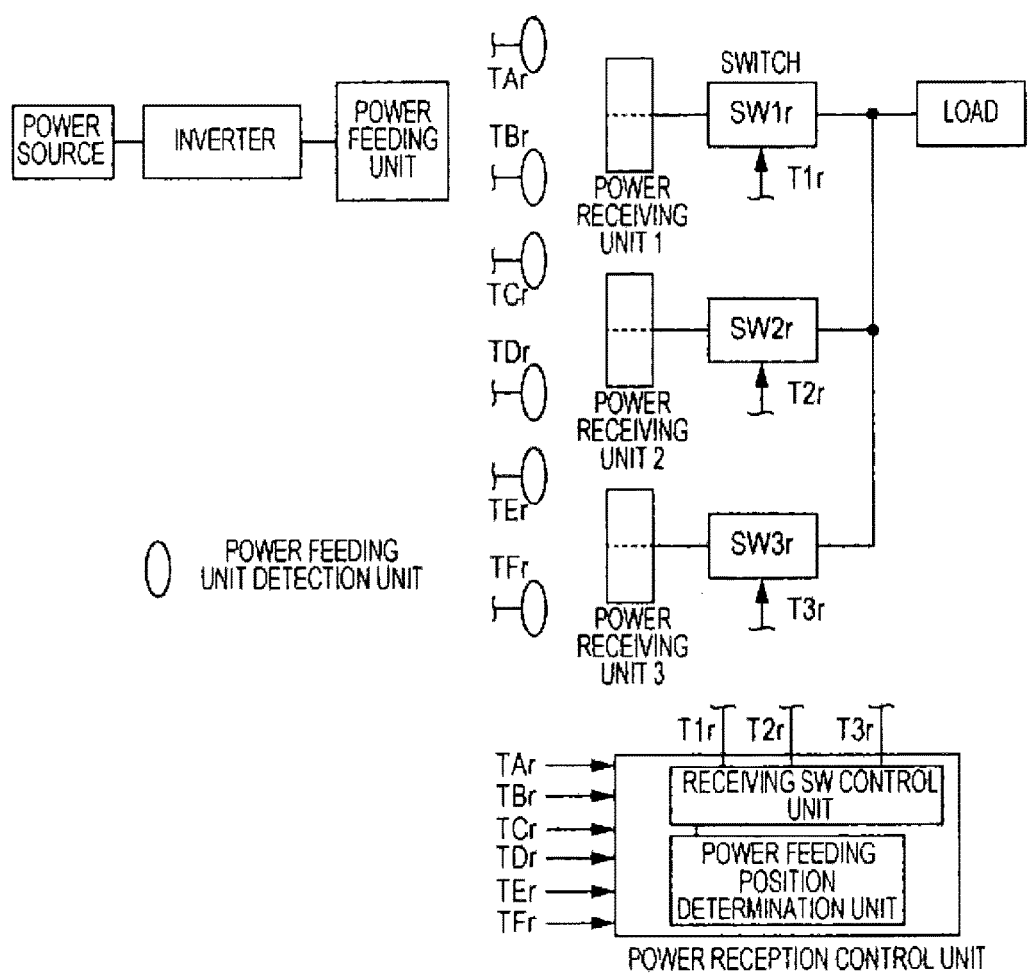
FIG. 17 is another example of a control circuit in the power receiving device according to the present embodiment.

FIG. 17 is another example of a power receiving control circuit in the power receiving device according to the present embodiment. The power receiving units 1 to 3 respectively includes power feeding unit detection units that detect magnetic flux from the power feeding unit. The power reception control unit that receives signals (TAr to TFr) from the power feeding unit detection unit includes a power feeding position determination unit and a receiving SW control unit, first, the power feeding position determination unit determines an appropriate power feeding position among the power receiving unit 1 to 3 based on the signals (TAr to TFr) from the power feeding unit detection unit. Subsequently, signals (T1r to T3r) are transmitted from the receiving SW control unit to the control circuit of the power receiving units 1 to 3 so that SW1r to SW3r are turned ON/OFF in order to obtain power from the power receiving unit located in a position suitable for obtaining power.

[Seventh Embodiment]

Figure 18:
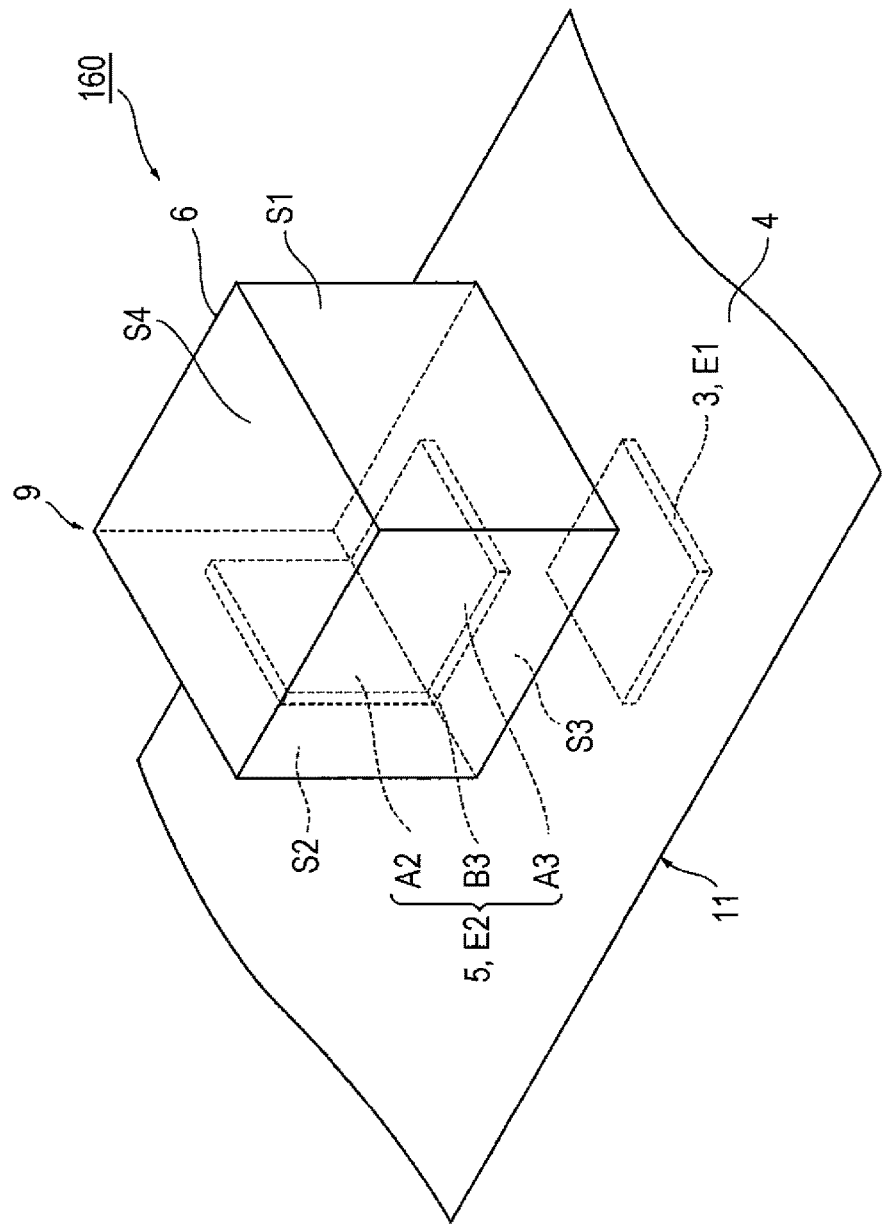
FIG. 18 is a perspective view of a wireless power transmission device according to a seventh embodiment of the present invention.

FIG. 18 is a perspective view of a wireless power transmission device according to a seventh embodiment of the present invention. A wireless power transmission device 160 according to the seventh embodiment, illustrated in FIG. 18, includes a power receiving device 9 according to the present invention and a power feeding device 11. The power receiving device 9 has a power receiving device main body 6 and a power receiving unit 5, and the power feeding device 11 has a power feeding device main body 4 and a power feeding unit 3. The power receiving unit 5 is constructed of an electrode E2, the power feeding unit 3 is constructed of an electrode E1, and power is transmitted from the power feeding device 11 to the power receiving device 9 by the electrode E2 and the electrode E1 being electrostatically combined.

Figure 19:
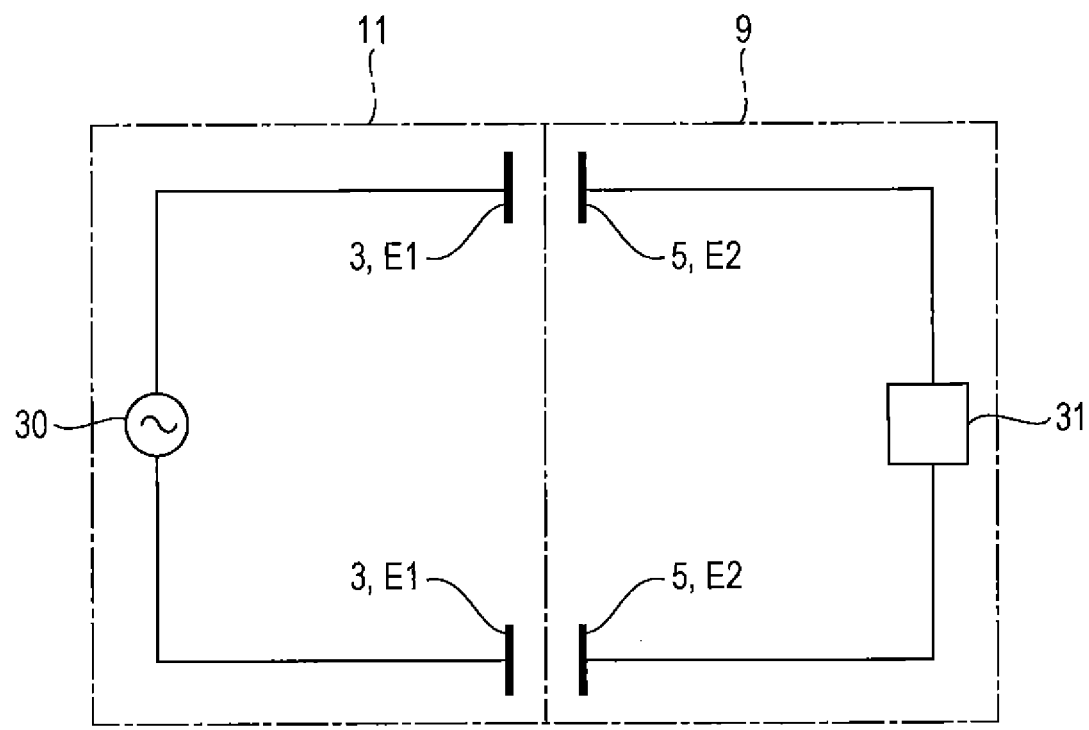
FIG. 19 is a schematic diagram illustrating another example of the combination mode of the power feeding unit and the power receiving unit.

FIG. 19 is a schematic diagram illustrating another example of a combination mode of the power feeding unit 3 and the power receiving unit 5. In the power feeding device 11, charges are accumulated in the electrode E1 by a current obtained from an AC power source 30 flowing through the electrode E1. The power receiving device 9 is disposed so as to be adjacent to the power feeding device 11 so that the electrode E2 is opposed to the electrode E1, and charge is induced in the electrode E2 by the charge accumulated in the electrode E1. Power is transmitted from the power feeding device 11 to the power receiving device 9 by the action of such an electric field coupling. A rectifier 31 rectifies a generated current, thereby allowing power to be supplied to the power receiving device 9. The strength of the electric field generated in the electrode E1 varies depending on the magnitude of the current flowing through the electrode E1, the size of a surface of the electrode E1 opposing the electrode E2, the distance between the electrode E2 and the opposed surface, and the like. Further, the amount of an electricity induced in the electrode E2 varies depending on the strength of the electric field generated in the electrode E1, the size of a surface of the electrode E2 opposing the electrode E1, the distance between the electrode E1 and the opposed surface, and the like. The above parameters such as the current flowing through the electrode E1 are adjusted so that an appropriate amount of power is supplied to the power receiving device 9.

The electrode E2 incorporated into the electric vehicle 9 has, as illustrated in FIG. 18, portions A3 and A2 which are respectively located along the faces S3 and S2 among six surfaces of the power receiving device 9. The electrode E2 may be packaged by a resin to configure a power receiving unit package (not shown). The face S3 is a bottom face of the power receiving device 9, and the face S2 is a side face of the power receiving device 9. The faces S3 and S2 form an outer shape of the power receiving device 9 and are not parallel to each other. Portions A3 and A2 which are respectively located along the bottom face S3 and the side face S2 are continuously disposed through a connecting portion B3.

Specifically, the electrode E2 includes two portions of a planer shape (planer portion) A2 and A3, and one connecting portion B3 which is curved or bent (curved portion or bent portion) interposed between the planer portions. The planer portion A3 of the electrode E2 is opposed to the bottom face S3 of the power receiving device 9, the planer portion A2 is opposed to the side face S2 of the power receiving device 9, and it is preferable that the planer portions A2 and A3 be respectively disposed so as to be parallel to the side face S2 and the bottom face S3. In addition, the connecting portion B3 is disposed to oppose a joining portion at which the bottom face S3 and the side face S2 of the electric vehicle 9 are in contact, and is curved or bent along the outer shape of the power receiving device 9. In other words, in the electrode E2, the power receiving face may be disposed along two or more surfaces which form the outer shape of the power receiving device 9 and are not parallel to each other, and more preferably may be parallel to these surfaces. In addition, in the present embodiment, "the power receiving face of the electrode" means "surface with the widest area of the electrode".

Although the shape of the electrode is not particularly limited, from the viewpoint of inducing more charges in the opposing surface of the electrode E1 and the electrode E2, it is preferable that the shape be the shape capable of sufficiently securing an area of the power receiving face such as a sheet shape and a plate shape (surface opposed to the electrode E1) of the electrode E2 and an area of a surface of the electrode E1 opposing the electrode E2. These shapes can be formed of a metal plate, a metal foil, a metal wire or the like.

Although the size of the opposing surfaces of the electrodes E1 and E2 is not particularly limited as long as an appropriate amount of power is fed to the power receiving device 9, in the view point of suppressing a decrease in power transmission efficiency when being deviated from the optimum receiving position, it is preferable to make an area of the planer portion of the electrode E2 on the power receiving side larger than the area of the electrode E1 on the power feeding side.

Although the distance between the opposing surfaces of the electrodes E1 and E2 also is not particularly limited as long as an appropriate amount of power is fed to the power receiving device 9, from the viewpoint of power transmission efficiency, it is preferable to shorten the distance.

The planer portion A3 of the electrode E2 is disposed so as to oppose the electrode E1 incorporated into the power feeding device 11 through the bottom face S3 of the power receiving device 9. By the electric field coupling between the electrode E1 and the electrode E2, power is transmitted from the power feeding device 11 to the power receiving device 9. On the other hand, even if planer portion A2 of the electrode E2 and the electrode E1 are disposed to oppose each other, power is fed to the power receiving device 9 by electric field coupling between the electrode E1 and the electrode E2. In other words, according to the wireless power feeding system according to the present embodiment, it is possible to feed power simply by using one electrode E2 rather than two electrodes E2 in the power receiving device 9 while having a degree of freedom in the arrangement of the power receiving device 9 and the power feeding device 11.

Further, as compared to a case of using two electrodes as the electrode E2, the number of wires to be drawn from the coil, the number of control devices connected to the wires, and the like can be reduced, and there is no limitation in the size of the power receiving device 9 from these conditions.

Although the electrode E2 has an L-shape in the present embodiment, it may have a U-shape, or a polygonal shape. Further, a plurality of electrodes of different shapes may be combined so as to be disposed.

[Eight Embodiment]

Figure 20:
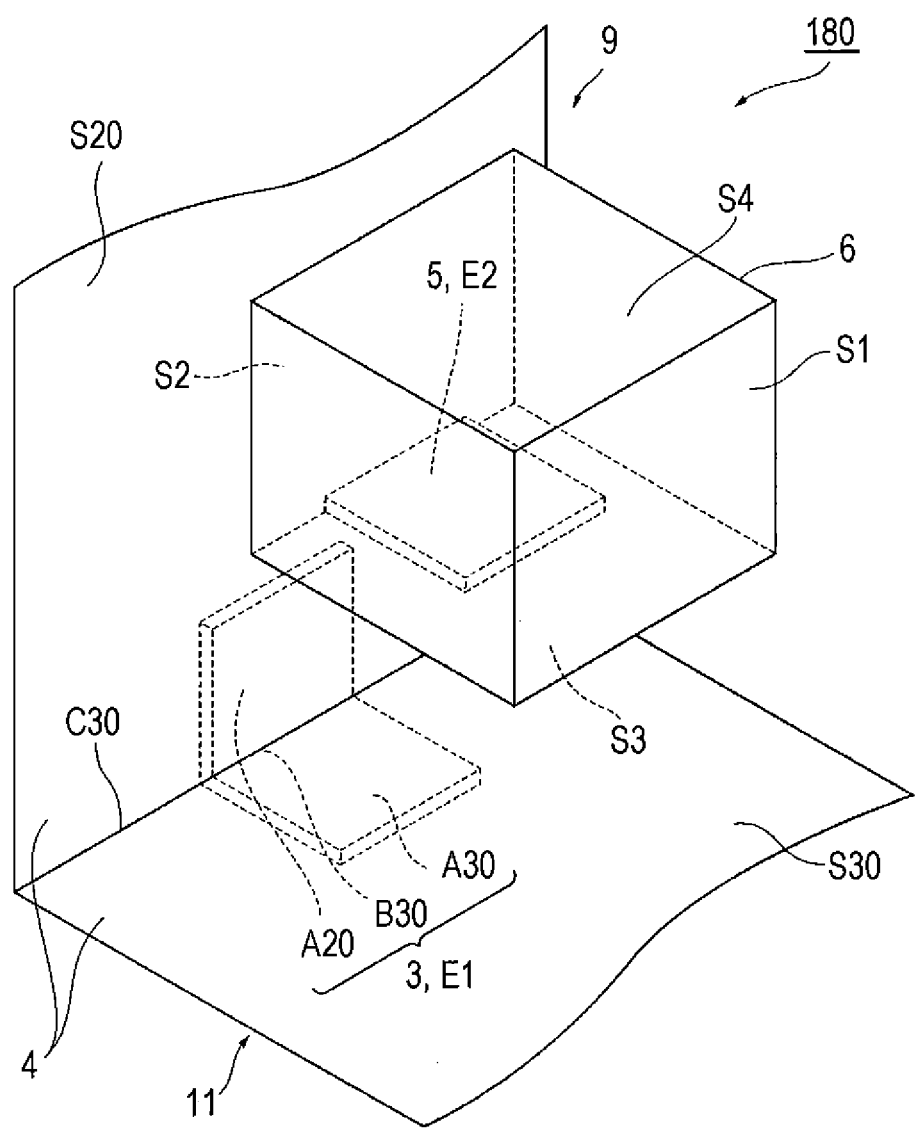
FIG. 20 is a perspective view of a wireless power transmission device according to an eighth embodiment of the present invention.

FIG. 20 is a perspective view of a wireless power transmission device according to an eighth embodiment of the present invention. A wireless power transmission device 180 according to the eighth embodiment, illustrated in FIG. 20, includes a power receiving device 9, and the power feeding device 11 according to the present invention. The electrode E1 incorporated into the power feeding device 11 has portions A30 and A20 which are respectively located along the faces S30 and S20 among a plurality of surfaces. The electrode E1 may be packaged by a resin to configure a power feeding unit package (not shown). The face S30 is a bottom face of the power feeding device 11, and the face S20 is a side face of the power feeding device 11. The faces S30 and S20 form an outer shape of the power feeding device 11 and are not parallel to each other. Portions A30 and A20 which are respectively located along the bottom face S30 and the side face S20 are continuously disposed through a connecting portion B30.

Specifically, the electrode E1 includes two portions of a planer shape (planer portion) A20 and A30, and one connecting portion B30 which is curved or bent (curved portion or bent portion) while being interposed between the planer portions. The planer portion A30 of the electrode E1 is opposed to the bottom face S30 of the power feeding device 11, the planer portion A20 is opposed to the side face S20 of the power feeding device 11, and it is preferable that the planer portions A20 and A30 be respectively disposed so as to be parallel to the side face S20 and the bottom face S30. In addition, the connecting portion B30 is disposed to oppose a joining portion C30 at which the bottom face S30 and the side face S20 of the power feeding device 11 are in contact with each other, and is curved or bent along the outer shape of the power feeding device 11. In other words, in the electrode E1, the power feeding face may be disposed along two or more surfaces which form the outer shape of the power feeding device 11 and are not parallel to each other, and more preferably may be parallel to these surfaces. In addition, in the present embodiment, "the power feeding face of the electrode" means "surface with the widest area of the electrode".

The planer portion A30 of the electrode E1 is disposed so as to oppose the electrode E2 incorporated into the power receiving device 9 through the bottom face S30 of the power feeding device 11. By the electric field coupling between the electrode E1 and the electrode E2, power is transmitted from the power feeding device 11 to the power receiving device 9. Even if the electrode E2 and the planer portion A20 of the electrode E1 is disposed to oppose each other, power is fed to the power receiving device 9 by electric field coupling between the electrode E1 and the electrode E2. In other words, according to the wireless power feeding system according to the present embodiment, it is possible to feed power simply by using one electrode E1 without using two electrodes E1 in the power feeding device 11 while having a degree of freedom in the arrangement of the power receiving device 9 and the power feeding device 11.

Further, as compared to a case of using two electrodes as the electrode E1, the number of wires to be drawn from the coil, the number of control devices connected to the wires, and the like can be reduced, and there is no limitation in the size of the power receiving device 9 from these conditions.

[Ninth Embodiment]

Figure 21:
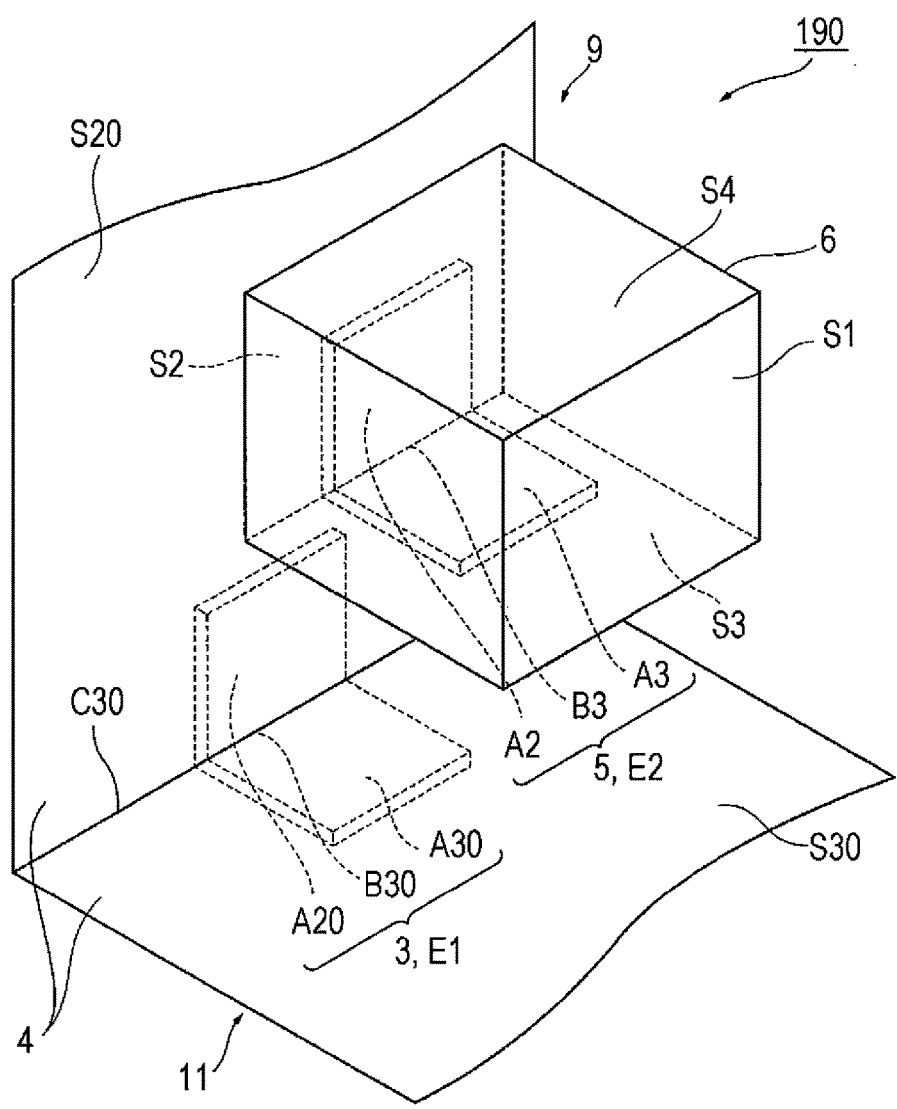
FIG. 21 is a perspective view of a wireless power transmission device according to a ninth embodiment of the present invention.
Figure 22:
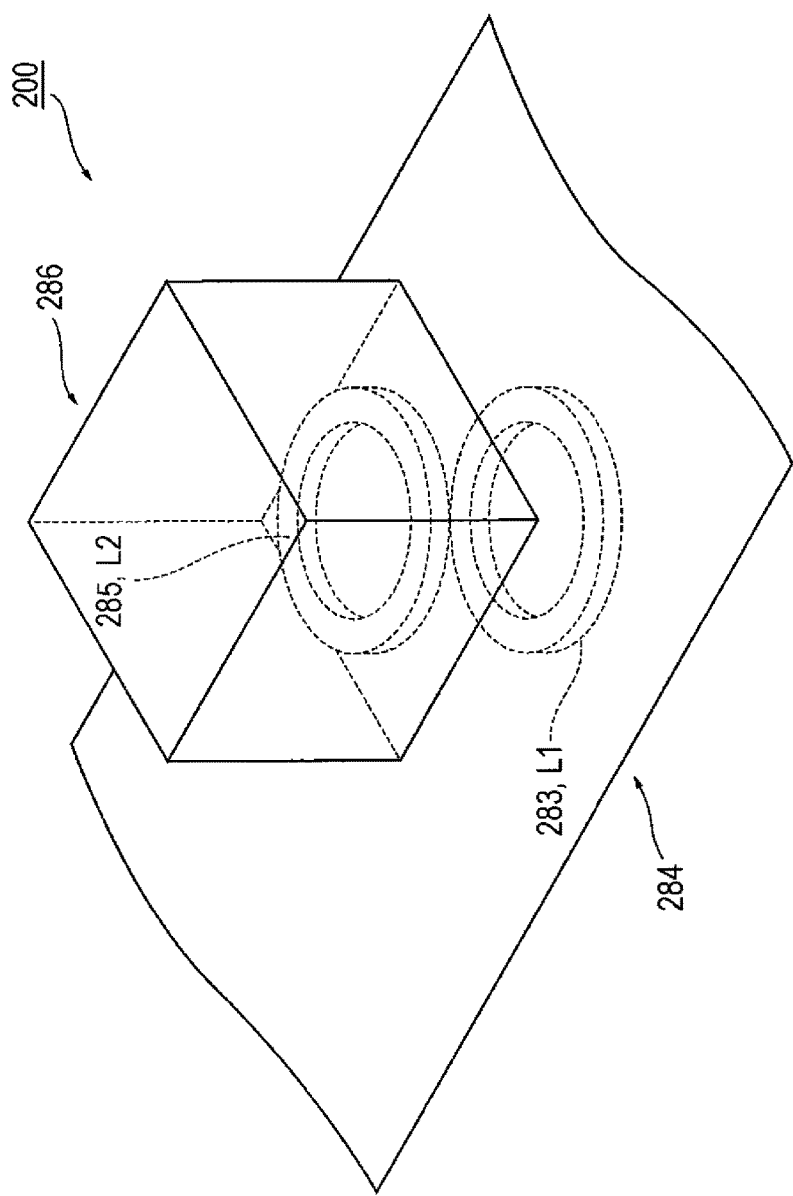
FIG. 22 is an example of the wireless power transmission device by electromagnetic induction.
Figure 23:
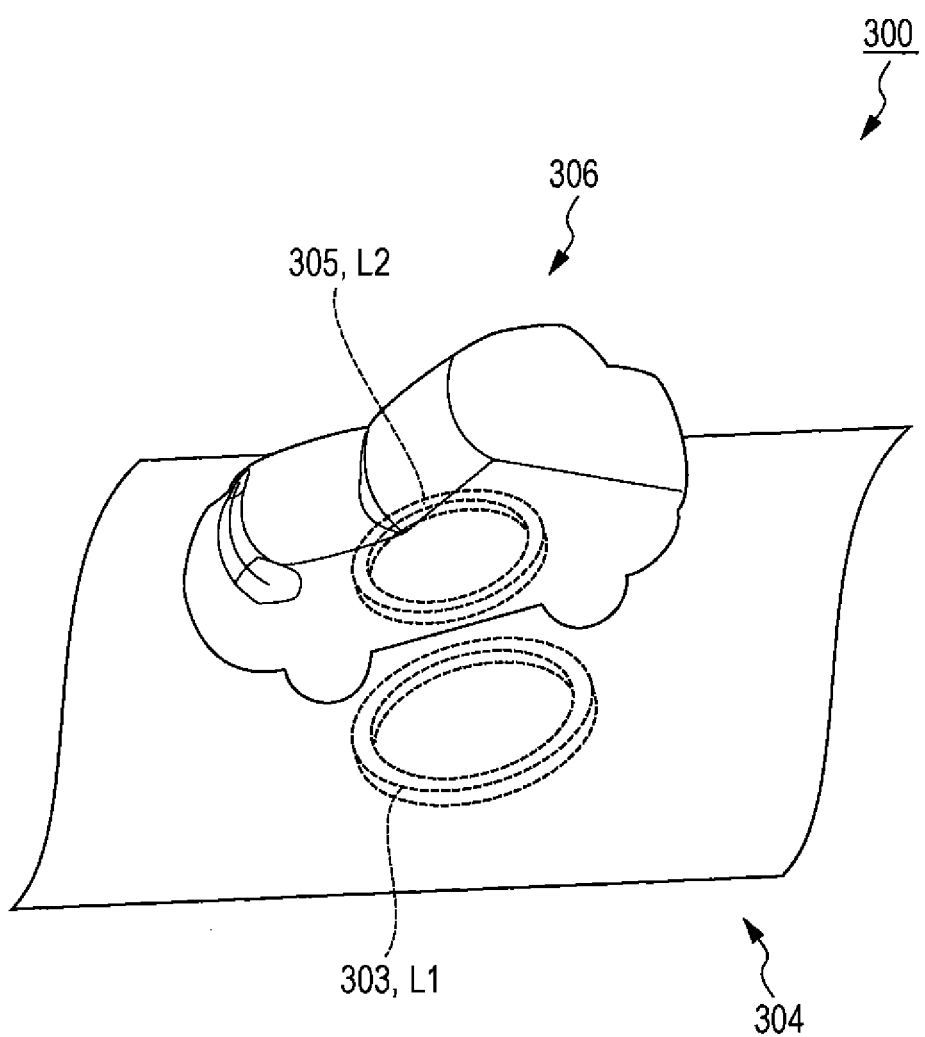
FIG. 23 is another example of the wireless power transmission device by electromagnetic induction.

FIG. 21 is a perspective view of a wireless power transmission device according to a ninth embodiment of the present invention. A wireless power transmission device 190 according to the ninth embodiment, illustrated in FIG. 21, includes a power receiving device 9 according to the seventh embodiment, and the power feeding device 11 according to the eighth embodiment.

Even if the electrode E2 and the electrode E1 are disposed to oppose each other so that the side face S2 of the power receiving device 9 is located in the bottom face, power is fed by electric field coupling between the electrode E1 and the electrode E2. Further, even if the electrode E1 and the electrode E2 are disposed to oppose each other so that the side face S20 of the power feeding device 11 is located in the bottom face, power is fed by electric field coupling between the electrode E1 and the electrode E2. In other words, according to the wireless power feeding system according to the present embodiment, it is possible to feed power simply by using one electrode E1 of the power feeding device 11 and one electrode E2 of the power receiving device 9 while having a degree of freedom in the arrangement of the power receiving device 9 and the power feeding device 11. Further, since the electrode E1 and the electrode E2 form a L-shape with each other, even if there is a positional deviation between the power receiving device 9 and the power feeding device 11, it is possible to reduce the degradation of power transmission efficiency as compared to a case where one or both of the electrodes E1 and E2 have a planer shape.

Further, as compared to a case of respectively using two electrodes as the electrode E1 and the electrode E2, the number of wires to be drawn from the coil, the number of control devices connected to the wires, and the like can be reduced, and there is no limitation in the size of the power feeding device 11 and the power receiving device 9 from these conditions.

According to the wireless power transmission devices according to the seventh to ninth embodiments, when the power receiving device 9 is a compact electric device such as a mobile phone, a plurality of power receiving devices 9 can be charged in one power feeding device 11. Further, even if there is a limited space in the power feeding device 11, there is no limitation in the arrangement direction of the power receiving device 9 to the power feeding device 11, and power can be fed even at a small place. However, applications are not limited thereto, as described above, the power receiving device 9 can be applied to the electric vehicle and the power feeding device 11 can be applied to a power feeding device for an electric vehicle.

Although the foregoing has described the preferred embodiments of the power receiving device, the power feeding device, and the wireless power feeding system, the invention is not limited thereto.

What is claimed is:

1. A power receiving device to which power is transmitted wirelessly from a power feeding device, comprising:
   one or more power receiving units including a secondary coil and a magnetic body, the secondary coil including:
   (a) a winding portion formed by a wound conductive wire;
   (b) an opening portion which is surrounded by the winding portion;
   (c) at least two planar portions, each planar portion including
      (i) a part of the winding portion and
      (ii) a part of the opening portion which is partially surrounded by the part of the winding portion; and
   (d) connecting portions that connect together the at least two planar portions,
   wherein each part of the opening portion of the secondary coil is disposed along a different one of two or more surfaces which form the outer shape of the power receiving device and are not parallel to each other, the two or more surfaces including (a) a first face that faces a surface in which a primary coil of the power feeding device is disposed and (b) a second face adjacent to the first face; and
   the magnetic body is disposed along the at least two planar portions of the secondary coil, each of the at least two planar portions being between the magnetic body and a different one of the two or more surfaces.

2. The power receiving device according to claim 1, wherein power receiving faces of a power receiving unit among the one or more power receiving units are disposed along the two or more surfaces which form the outer shape of the power receiving device and are not parallel to each other.

3. A wireless power transmission device comprising:
   a power receiving device including a power receiving unit; and
   a power feeding device including a power feeding unit,
   wherein the power receiving device and the power feeding device are disposed so that at least a part of the power receiving unit and at least a part of the power feeding unit are opposed to each other, and
   wherein the power receiving device is the power receiving device according to claim 1, and receives power wirelessly from the power feeding device.

4. The wireless power transmission device according to claim 3,
   wherein power receiving faces of a power receiving unit among the one or more power receiving units are disposed along the two or more surfaces which form the outer shape of the power receiving device and are not parallel to each other.

* * * * *